(12) United States Patent
Minoura

(10) Patent No.: US 12,125,020 B2
(45) Date of Patent: Oct. 22, 2024

(54) TRANSACTION PROCESSING SYSTEM, TRANSACTION PROCESSING DEVICE, AND INFORMATION PROCESSING METHOD

(71) Applicant: Toshiba Tec Kabushiki Kaisha, Tokyo (JP)

(72) Inventor: Yusuke Minoura, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 45 days.

(21) Appl. No.: 18/183,905

(22) Filed: Mar. 14, 2023

(65) Prior Publication Data

US 2023/0419296 A1    Dec. 28, 2023

(30) Foreign Application Priority Data

Jun. 23, 2022    (JP) .................................. 2022-101343

(51) Int. Cl.
| | |
|---|---|
| G06Q 30/06 | (2023.01) |
| G06Q 10/087 | (2023.01) |
| G06Q 20/20 | (2012.01) |
| G06Q 20/32 | (2012.01) |
| G06Q 20/38 | (2012.01) |
| G06Q 30/0601 | (2023.01) |

(52) U.S. Cl.
CPC ....... *G06Q 20/3267* (2020.05); *G06Q 10/087* (2013.01); *G06Q 20/208* (2013.01); *G06Q 20/389* (2013.01); *G06Q 30/0641* (2013.01)

(58) Field of Classification Search
CPC . G06Q 10/087; G06Q 20/208; G06Q 30/0641

USPC ..................................................... 705/35, 39
See application file for complete search history.

(56) References Cited

U.S. PATENT DOCUMENTS

| | | | |
|---|---|---|---|
| 10,402,776 B2* | 9/2019 | Grabovski | ............. G06Q 20/10 |
| 2015/0347957 A1* | 12/2015 | Vasantham | ......... G06F 16/2455 |
| | | | 705/28 |
| 2016/0171432 A1* | 6/2016 | Pugh | .................. G06Q 30/0222 |
| | | | 705/26.81 |

(Continued)

FOREIGN PATENT DOCUMENTS

| | | |
|---|---|---|
| JP | 2018013822 A | 1/2018 |
| SE | 544310 C2 * | 4/2022 ............. G06Q 10/06 |

*Primary Examiner* — William E Rankins
(74) *Attorney, Agent, or Firm* — Kim & Stewart LLP

(57) ABSTRACT

According to one embodiment, a transaction processing system for retail stores that sell optionally deliverable commodities includes a communication network connectable to a mobile user terminal permitting a customer to register items for purchase on a sales floor of a store. A transaction processing server stories commodity codes for items sold by the store. Each commodity code is associated with a deliverable flag indicating whether the item is deliverable. A processor of the server is configured to: determine whether a registered commodity code is a deliverable commodity based on the deliverable flag value associated with the registered commodity code; cause the mobile user terminal to display a decision screen for receiving a selection input from the customer to have the item delivered or not; and register the customer's selection in conjunction with the registered commodity code to permit settlement of the sales transaction including the deliverable commodity.

20 Claims, 24 Drawing Sheets

(56) References Cited

U.S. PATENT DOCUMENTS

2020/0387857 A1* 12/2020 Smith .................... G06F 21/31
2023/0081250 A1* 3/2023 Karri .................. G06Q 30/0601
　　　　　　　　　　　　　　　　　　　　705/26.1

* cited by examiner

FIG. 22

```
                            DELIVERY INSTRUCTION

PLEASE MAKE SURE TO ARRANGE DELIVERY FOR THE FOLLOWING COMMODITIES.

NAME: MR./MS.  ○○   ○○

COMMODITY NAME    QUANTITY    DELIVERY DESTINATION

BBBBB             1           × × × × × ×  SHINAGAWA, TOKYO

CCCCC             1           × × × × × ×  SHINAGAWA, TOKYO

EEEEE             1           × × × × × ×  SHINAGAWA, TOKYO
```
SCH

FIG. 25

┌─ SCK

DELIVERY INSTRUCTION

PLEASE RECEIVE PICKED UP COMMODITY AND ARRANGE DELIVERY FOR THE FOLLOWING COMMODITIES.

NAME: MR./MS. ○○ ○○

| COMMODITY NAME | QUANTITY | DELIVERY DESTINATION |
|---|---|---|
| BBBBB | 1 | ×××××× SHINAGAWA, TOKYO |
| CCCCC | 1 | ×××××× SHINAGAWA, TOKYO |
| EEEEE | 1 | ×××××× SHINAGAWA, TOKYO |

FIG. 27

```
                          DELIVERY INSTRUCTION

PLEASE ARRANGE DELIVERY FOR THE FOLLOWING COMMODITIES
                 INCLUDING COMMODITY PUT IN DELIVERY BASKET.

NAME: MR./MS.  OO  OO
                                                    BASKET NUMBER: 1001

COMMODITY NAME    QUANTITY    DELIVERY DESTINATION

BBBBB             1           × × × × × ×  SHINAGAWA, TOKYO

CCCCC             1           × × × × × ×  SHINAGAWA, TOKYO

EEEEE             1           × × × × × ×  SHINAGAWA, TOKYO
```

SCM

TRANSACTION PROCESSING SYSTEM, TRANSACTION PROCESSING DEVICE, AND INFORMATION PROCESSING METHOD

CROSS-REFERENCE TO RELATED APPLICATION

This application is based upon and claims the benefit of priority from Japanese Patent Application No. 2022-101343, filed Jun. 23, 2022, the entire contents of which are incorporated herein by reference.

FIELD

Embodiments described herein relate generally to a transaction processing system for retail purchases, a transaction processing device for such a system, and an information processing method implemented in such a system.

BACKGROUND

A system that permits processing of a retail transaction using a customer's own communication terminal, such as a smartphone, or a communication terminal lent to the customer by the store as system user interface can be referred to as a "smart POS system" or the like. A similar transaction processing system that processes a retail transaction using a communication terminal attached to a shopping cart provided by the store as a system user interface is known as a "cart POS system" or the like.

When a customer requests the store to deliver some of the items from among items being purchased using such a transaction processing system to a home address or the like, the existing art requires all items being purchased by the customer to be picked up from a sales area and then those items that are to be delivered must be handed over to a store clerk to be later delivered to the home address or the like as requested by the customer. Therefore, it is troublesome for the customer to have items purchased in person at the store delivered to a home address or the like.

In view of such circumstances, it is desired to reduce trouble for a user.

BRIEF DESCRIPTION OF THE DRAWINGS

FIG. 22 is a diagram illustrating an example of a first delivery instruction screen.

FIG. 25 is a diagram illustrating an example of a second delivery instruction screen.

FIG. 27 is a diagram illustrating an example of a third delivery instruction screen.

DETAILED DESCRIPTION

In general, a transaction processing system, a transaction processing device, and an information processing method for reducing trouble associated with customer delivery requests and the like are described.

In general, according to one embodiment, a transaction processing system for retail stores selling optionally deliverable commodities to customers includes a communication network in a store. The communication network is connectable to a mobile user terminal in the store. The mobile user terminal permits a customer to register items on a sales floor of the store to be purchased in a sales transaction. A transaction processing server is connected to the communication network and stores commodity codes for the items sold by the store. Each commodity code is associated with a deliverable flag value indicating whether the particular item associated with the commodity code is a deliverable commodity (e.g., delivery service is available upon request). The transaction processing server includes a processor configured to: determine whether a registered commodity code from the mobile user terminal is a deliverable commodity based on the deliverable flag value associated with the registered commodity code; cause the mobile user terminal to display a decision screen if the item corresponding to the registered commodity code is a deliverable commodity for receiving a selection from the customer to have the item delivered or not; and register the selection in conjunction with the registered commodity code to permit settlement of the sales transaction including the deliverable commodity.

Hereinafter, a non-limiting example embodiment will be described with reference to the drawings.

Figure 1:
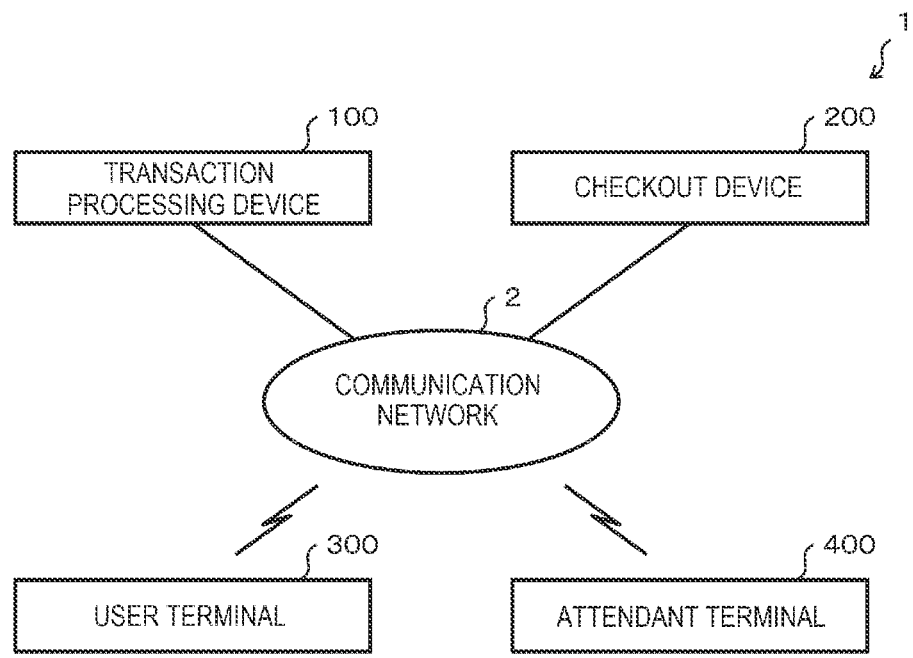
FIG. 1 is a block diagram illustrating a schematic configuration of a transaction processing system according to an embodiment.

FIG. 1 is a block diagram illustrating a schematic configuration of a transaction processing system 1 according to the present embodiment.

The transaction processing system 1 is configured such that a transaction processing device 100, a checkout device 200, a user terminal 300, and an attendant terminal 400 can communicate with one another via a communication network 2.

The Internet, a virtual private network (VPN), a LAN, a public communication network, a mobile communication network, and the like can be appropriately used alone or in combination as the communication network 2. For example, the Internet and the mobile communication network are used in combination as the communication network 2.

In the transaction processing system 1, the number of the transaction processing devices 100, the number of the checkout devices 200, the number of the user terminals 300, and the number of the attendant terminals 400 may be freely set, though only one transaction processing device 100, one checkout device 200, one user terminal 300, and one attendant terminal 400 are illustrated in FIG. 1 as representative of the others.

The transaction processing device 100 executes an information processing for processing a commodity trade transaction (retail transaction) between a user (a customer) and a store according to operations performed by the user in the store by using a checkout device 200 and a user terminal 300 as user interface terminals. The transaction processing device 100 is implemented as, for example, a cloud server, and processes transactions from a plurality of stores. In some examples, the transaction processing device 100 may be implemented as, for example, a local server, and may process a transaction for only one store.

The checkout device 200 is installed in a store and executes a checkout processing for completing a transaction processed by the transaction processing device 100. The checkout device 200 receives operations from an operator during this checkout processing. The checkout device 200 can be a terminal device that receives an input operation from a customer during checking out. In some examples, the checkout device 200 may be operated by a store clerk or the like instead of customer during the checkout processing. In the present embodiment, the operator of the checkout device 200 is mainly a customer, though a store clerk may also be an operator of the checkout device 200 in some instances.

The user terminal 300 is an information processing terminal carried by a user. The user terminal 300 is typically owned by the customer (user) and carried into the store. In some examples, the user terminal 300 may be lent from the store to the user, attached to a shopping cart provided in the store, or the like. The user terminal 300 is a device that receives an input operation performed by the user for transaction processing by the transaction processing device 100.

The attendant terminal 400 is carried by a store clerk. The attendant terminal 400 is a device used as a user interface for supporting an input operation of a store clerk during transaction processing by the transaction processing system 1.

Figure 2:
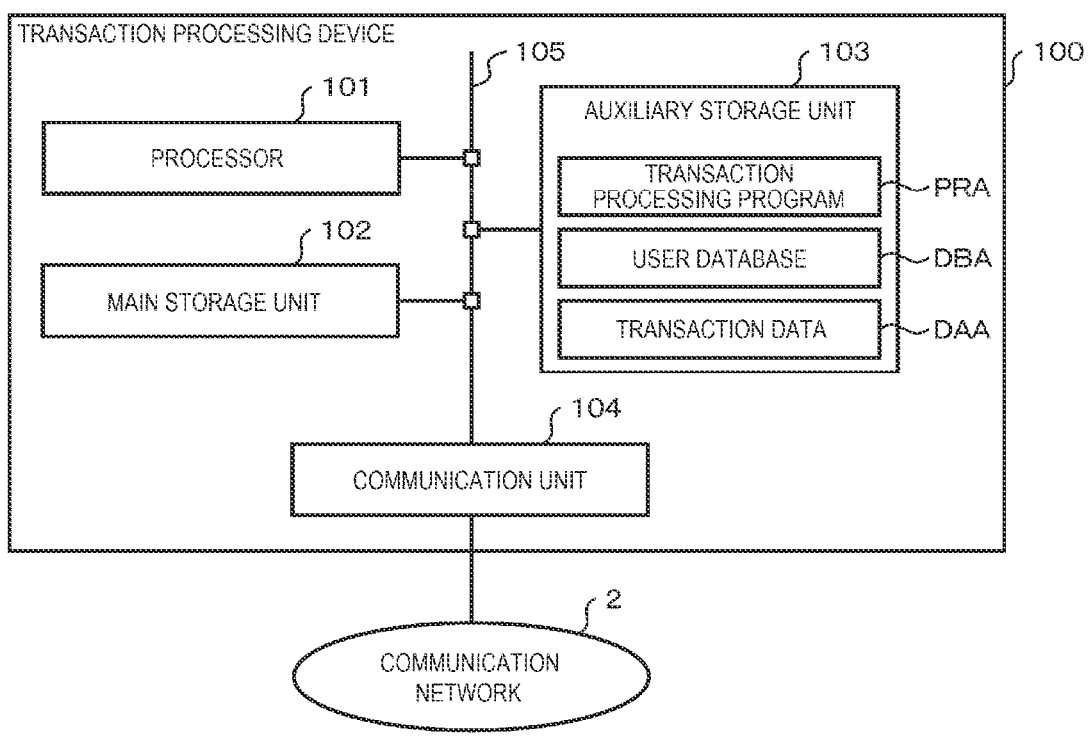
FIG. 2 is a block diagram of a transaction processing device.

FIG. 2 is a block diagram illustrating a transaction processing device 100.

The transaction processing device 100 includes a processor 101, a main storage unit 102, an auxiliary storage unit 103, a communication unit 104, a transmission path 105, and the like. The processor 101 can communicate with the main storage unit 102, the auxiliary storage unit 103, and the communication unit 104 via the transmission path 105.

The processor 101, the main storage unit 102, and the auxiliary storage unit 103 are connected to one another by the transmission path 105.

The processor 101 corresponds to a central part of a computer. The processor 101 executes an information processing for controlling units to implement various functions of the transaction processing device 100 according to an operating system and/or information processing programs such as application programs.

The main storage unit 102 includes a read-only memory area and a rewritable memory area. The main storage unit 102 stores a part of the information processing programs in the read-only memory area. In addition, the main storage unit 102 may store data required by the processor 101 in the read-only memory area or the rewritable memory area. The main storage unit 102 uses the rewritable memory area as a work area for the processor 101.

The auxiliary storage unit 103 may be, for example, an electric erasable programmable read-only memory (EEPROM), a hard disc drive (HDD), a solid-state drive (SSD), or other types of storage devices. The auxiliary storage unit 103 stores data used when the processor 101 executes various processing and data generated by the processor 101. The auxiliary storage unit 103 may store an information processing program executed by the processor 101. In the present embodiment, the auxiliary storage unit 103 stores a transaction processing program PRA. The transaction processing program PRA is an application program with program instructions for transaction processing including registration processing. A part of a storage area of the auxiliary storage unit 103 is used as an area for storing a user database DBA and transaction data DAA. The user database DBA is a database for managing users of a smart POS service. The transaction data DAA is data indicating contents (details) of a transaction.

The communication unit 104 executes a communication processing for performing data communication via the communication network 2. The communication unit 104 may be, for example, an existing Internet communication device.

The transmission path 105 includes an address bus, a data bus, a control signal line, and the like, and transmits data and a control signal transmitted and received among connected units.

Figure 3:
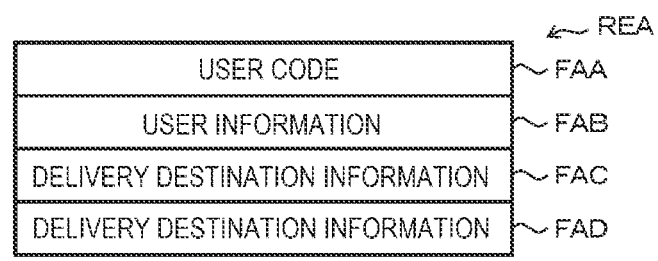
FIG. 3 is a diagram schematically illustrating a configuration of a data record included in a user database.

FIG. 3 is a diagram schematically illustrating a configuration of a data record REA included in the user database DBA.

The user database DBA is a set (group) of data records REA associated with users.

The data record REA includes fields FAA and FAB. The data record REA may include any number of fields after a field FAC. An identifier (hereinafter, referred to as a user code or a user ID code) for identifying an associated user is set in the field FAA. Various kinds of user information required for the user to use a smart POS service are set in the field FAB. The user information includes personal information of the user such as a name and an address. The user information may include settlement information such as credit card information. A user can appropriately pre-register a delivery destination for a commodity. When a user registers a delivery destination, a field for delivery destination information can be added to the data record REA. FIG. 3 illustrates a state in which two delivery destinations have been registered by the user, and delivery destination information about the two different delivery destinations is in fields FAC and FAD, respectively. The delivery destination information includes information, such as a street address or the like, necessary for delivering a commodity.

Figure 4:
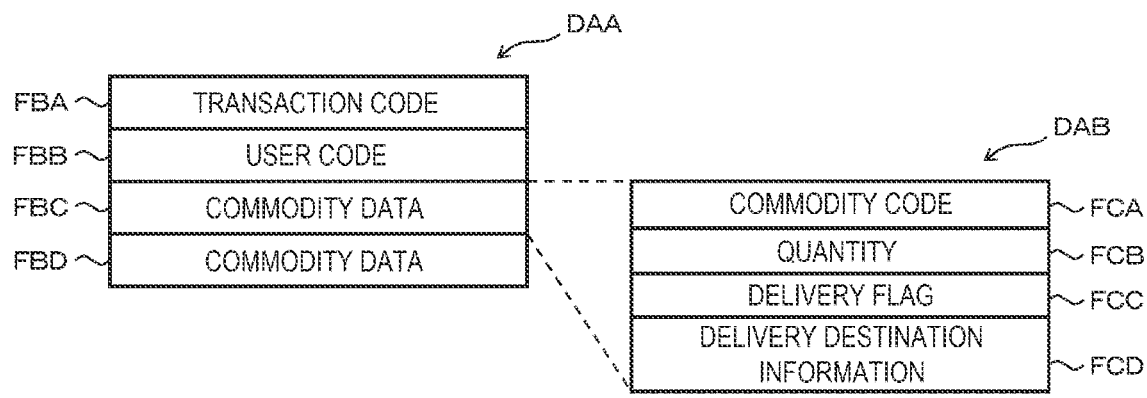
FIG. 4 is a diagram schematically illustrating a configuration of transaction data and a data record included in the transaction data.

FIG. 4 is a diagram schematically illustrating a configuration of the transaction data DAA and a configuration of one piece of commodity data DAB included in the transaction data DAA.

The transaction data DAA is generated during a transaction executed by the transaction processing device 100 and is then stored in the auxiliary storage unit 103. Thus, the auxiliary storage unit 103 may initially store no transaction data DAA, or the auxiliary storage unit 103 may store a plurality of pieces of transaction data DAA depending on the number of previous transactions of the user.

The transaction data DAA includes just the fields FBA and FBB, however, the transaction data DAA may include any number of fields after a field FBC. A transaction code serving as an individual identifier of each separate transaction is set in the field FBA. A user code of the user who performs the transaction is set in the field FBB. When there is a registered commodity (registered item) in the transaction (hereinafter, referred to as a transaction commodity), a field associated with the transaction commodity is added to the transaction data DAA. FIG. 4 illustrates a state in which there are two different transaction commodities, and commodity data related to these two different transaction commodities is set in fields FBC and FBD, respectively. When more than two transaction commodities are registered in a transaction, additional fields are provided in the transaction data DAA as necessary.

Commodity data DAB set in each of the fields FBC, FBD includes fields FCA, FCB, FCC, and FCD. A commodity code that is an identifier of the transaction commodity is set in the field FCA. A quantity of the transaction commodity is set in the field FCB (in this context, quantity refers to the number of items in the transaction that have the same commodity code, that is, multiple instances of the same commodity type). A delivery flag indicating whether the transaction commodity is a delivery target is set in the field FCC. When the transaction commodity is a delivery target, information about a delivery destination for the transaction commodity is set in the field FCD. The commodity data DAB can include additional fields besides the fields FCA, FCB, FCC, and FCD, and various kinds of information other than those described above, such as a commodity name, a unit price, and discount information may be set in the commodity data DAB via these additional fields.

In general, the basic hardware of the transaction processing device 100 may be the same as a general-purpose server device. However, when the transaction processing device 100 (processor 101) executes transaction processing program PRA the transaction processing device 100 (processor 101) is specifically configured according to the program instructions of transaction processing program PRA. Typically, the transaction processing device 100 may be transferred with the transaction processing program PRA already stored in the auxiliary storage unit 103 though user database DBA and transaction data DAA might not yet be not stored in the auxiliary storage unit 103. The transaction processing program PRA and the hardware of the transaction processing device 100 may be transferred separately then later combined with each other. That is, the transaction processing program PRA may be provided after the hardware or an earlier/different version of a transaction processing program similar though distinct from transaction processing program PRA may be updated or otherwise modified to be transaction processing program PRA as described. Transfer of the transaction processing program PRA can be performed by recording the transaction processing program PRA in a removable recording medium such as a magnetic disc, a magneto-optical disc, an optical disc, or a semiconductor memory, or by communication via a network.

Figure 5:
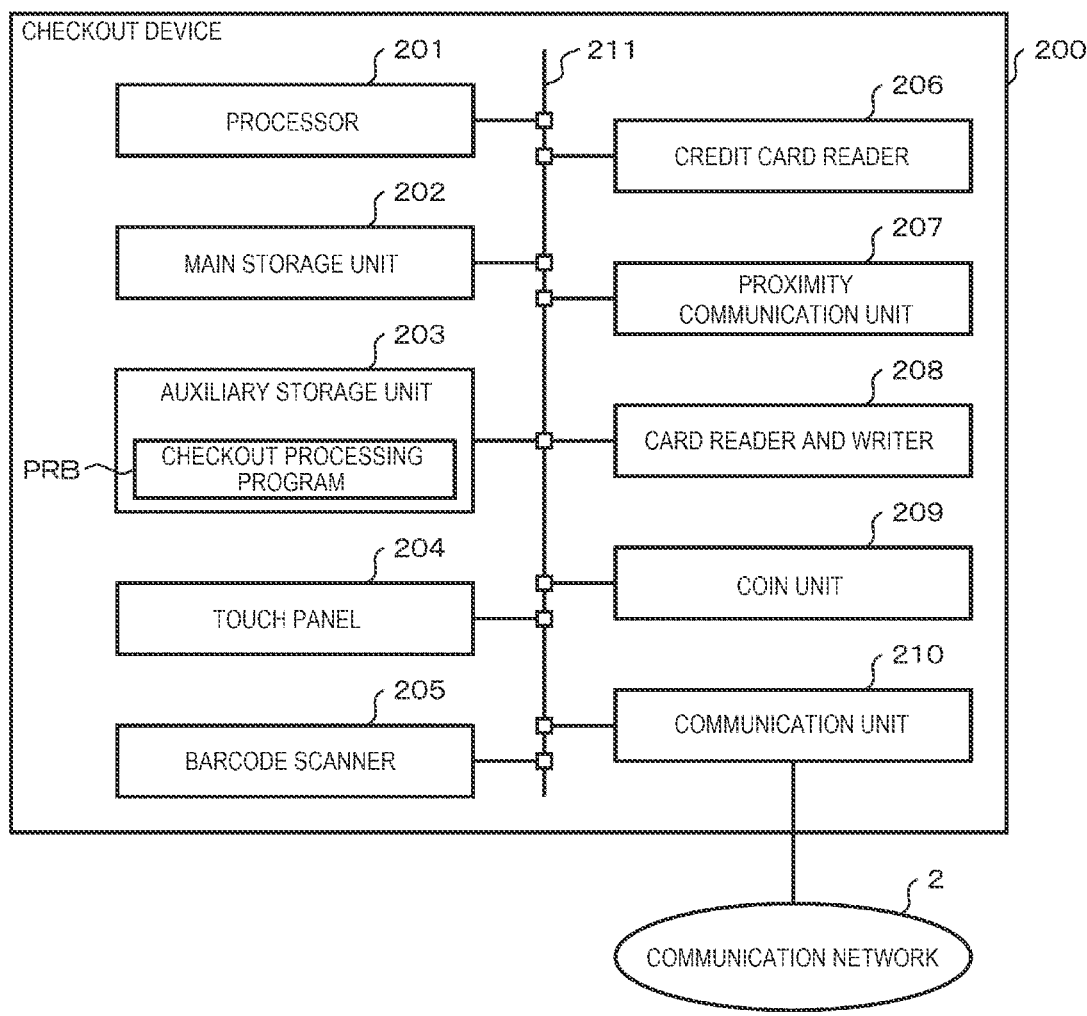
FIG. 5 is a block diagram of a checkout device.

FIG. 5 is a block diagram illustrating a checkout device 200.

The checkout device 200 includes a processor 201, a main storage unit 202, an auxiliary storage unit 203, a touch panel 204, a barcode scanner 205, a credit card reader 206, a proximity communication unit 207, a card reader and writer 208, a coin unit 209, a communication unit 210, and a transmission path 211. The processor 201, the main storage unit 202, the auxiliary storage unit 203, the touch panel 204, the barcode scanner 205, the credit card reader 206, the proximity communication unit 207, the card reader and writer 208, the coin unit 209, and the communication unit 210 are connected to the transmission path 211.

In general, the basic functions of the processor 201, the main storage unit 202, the auxiliary storage unit 203, and the transmission path 211 are substantially the same as basic functions of the processor 101, the main storage unit 102, the auxiliary storage unit 103, and the transmission path 105. The auxiliary storage unit 203 stores a checkout processing program PRB (instead of the transaction processing program PRA). The checkout processing program PRB is an application program that includes program instructions for a processing procedure performed for checking out (transaction settlement) based on checkout information acquired from the transaction processing device 100.

The touch panel 204 displays a screen for presenting information to an operator. In addition, the touch panel 204 can be used to input an instruction by a touch operation performed on the screen by the operator.

The barcode scanner 205 optically reads a barcode that faces a reading port. The barcode scanner 205 outputs barcode information indicated by the read barcode.

The credit card reader 206 reads information (card information) from a credit card.

The proximity communication unit 207 performs proximity wireless communication with a proximity wireless tag and acquires data stored in the wireless tag. The proximity communication unit 207 may also write information to the wireless tag through proximity wireless communication.

The card reader and writer 208 reads card data recorded in a predetermined type of card such as a membership card or a prepaid card. The card reader and writer 208 writes data to the membership card.

The coin unit 209 counts coins inserted from a coin slot and stores the coins in an internal storage. The coin unit 209 discharges the coins stored in the storage to a coin tray via a coin discharge port. The coin unit 209 also counts bills inserted from a bill slot and stores the bills in an internal storage. The coin unit 209 discharges the bills stored in the storage from a bill discharge port.

The communication unit 210 executes a communication processing for the processor 201 to transmit various kinds of data to and receives various kinds of data from other devices such as the transaction processing device 100 via the communication network 2. A device conforming to the communication system of the communication network 2 may be used as the communication unit 210.

The transmission path 211 includes an address bus, a data bus, a control signal line, and the like. The transmission path 211 transmits data and a signal to be exchanged between connected units.

In general, the basic hardware of a checkout device 200 can be substantially the same as a similar purpose device in existing POS systems. However, when the checkout device 200 (processor 201) executes checkout processing program PRB the checkout device 200 (processor 201) is specifically configured according to the program instructions of checkout processing program PRB. Typically, the checkout device 200 may be transferred with the checkout processing program PRB already stored in the auxiliary storage unit 203. The checkout processing program PRB and the hardware of the checkout device 200 may be transferred separately then later combined with each other. That is, the checkout processing program PRB may be provided after the hardware or an earlier/different version of a checkout processing program similar though distinct from checkout processing program PRB may be updated or otherwise modified to be checkout processing program PRB as described. Transfer of the checkout processing program PRB can be performed by recording the checkout processing program PRB in a removable recording medium such as a magnetic disc, a magneto-optical disc, an optical disc, or a semiconductor memory, or by communication via a network.

Figure 6:
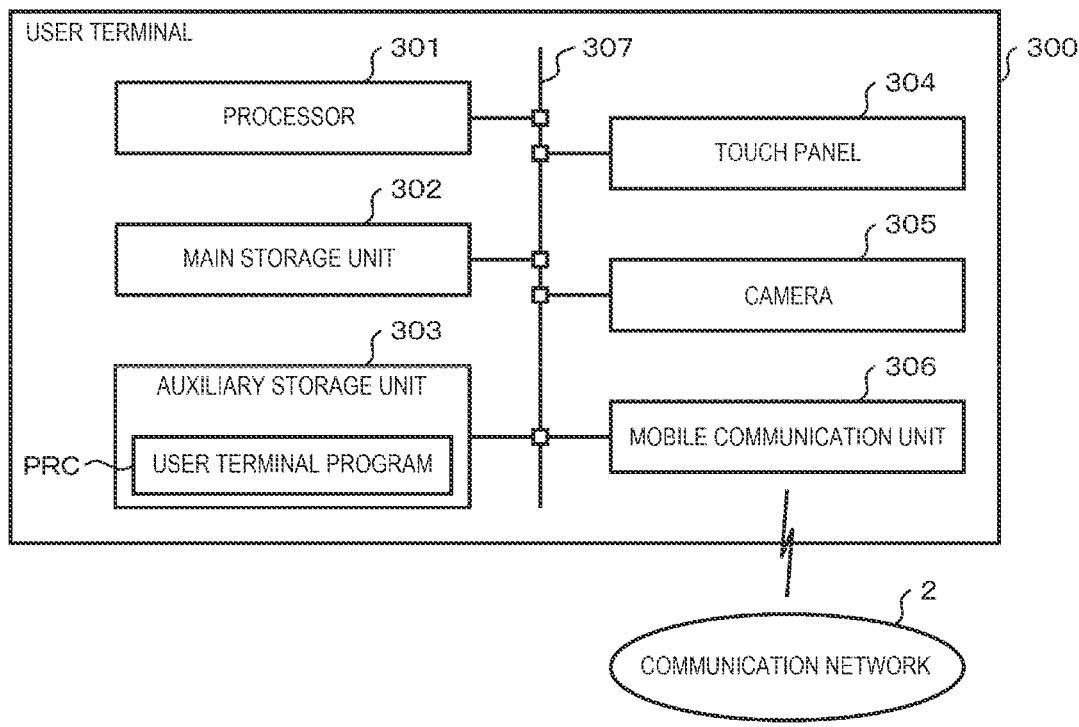
FIG. 6 is a block diagram of a user terminal.

FIG. 6 is a block diagram illustrating a user terminal 300.

The user terminal 300 includes a processor 301, a main storage unit 302, an auxiliary storage unit 303, a touch panel 304, a camera 305, a mobile communication unit 306, a transmission path 307, and the like.

In general, the basic functions of the processor 301, the main storage unit 302, the auxiliary storage unit 303, and the transmission path 307 are substantially the same as basic functions of the processor 101, the main storage unit 102, the auxiliary storage unit 103, and the transmission path 105. The auxiliary storage unit 303 stores a user terminal program PRC (instead of the transaction processing program PRA). The user terminal program PRC is an application program that includes program instructions to be executed by processor 301 for causing the user terminal 300 to operate as a user interface for transaction processing executed by the transaction processing device 100.

The touch panel 304 displays a screen for presenting information to an operator. In addition, the touch panel 304 is used to input an instruction by a touch operation performed on the screen by the operator.

The camera 305 includes an optical system and an image sensor. The image sensor generates image data representing an image in a field of view formed by the optical system.

The mobile communication unit 306 is an interface for data communication performed via the communication network 2. For example, a communication device for performing data communication via a mobile communication network may be used as the mobile communication unit 306.

In the present example, it is assumed that a smartphone is used as the basic hardware of the user terminal 300.

Figure 7:
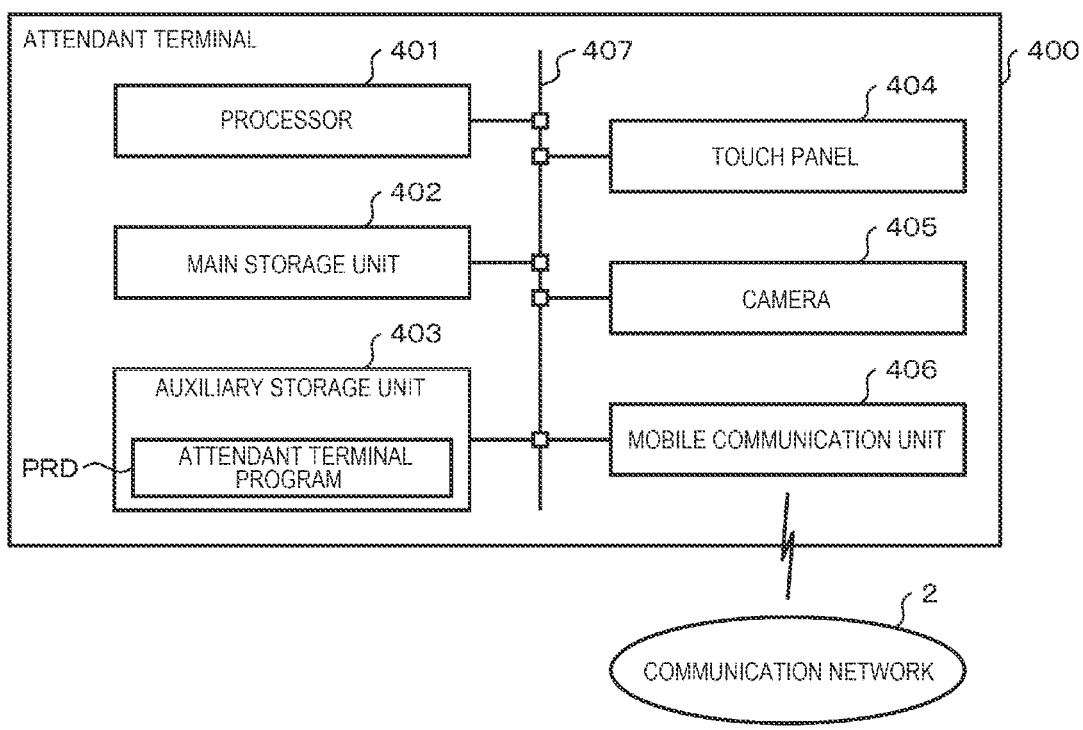
FIG. 7 is a block diagram of an attendant terminal.

FIG. 7 is a block diagram illustrating an attendant terminal 400.

The attendant terminal 400 includes a processor 401, a main storage unit 402, an auxiliary storage unit 403, a touch panel 404, a camera 405, a mobile communication unit 406, a transmission path 407, and the like.

In general, the basic functions of the processor 401, the main storage unit 402, the auxiliary storage unit 403, and the transmission path 407 are substantially the same as basic functions of the processor 101, the main storage unit 102, the auxiliary storage unit 103, and the transmission path 105. Functions of the touch panel 404, the camera 405, and the mobile communication unit 406 are substantially the same as functions of the touch panel 304, the camera 305, and the mobile communication unit 306. The auxiliary storage unit 403 stores an attendant terminal program PRD. The attendant terminal program PRD is an application program that includes program instructions for a procedure of an information processing by the processor 401 for causing the attendant terminal 400 to operate as a user interface for a store clerk who supports a transaction performed by the transaction processing device 100.

In some examples, a stationary computer terminal (e.g., a desktop PC or the like) may be used as the attendant terminal 400. In such a case, a communication unit for wired communication may be used instead of the mobile communication unit 406.

Next, operations of the transaction processing system 1 will be described. The following description is merely an example, and it is possible to change, vary, or even omit some of the described processing. Additional processing may also be incorporated. In the following description, processing that would be performed in an actual implementation has been omitted in order to focus the provided description on features related to improved operations and system improvements over the existing technologies. For example, when an error occurs, processing for coping with the error would be performed in an actual implementation, but specific description for such error processing is omitted since it can be substantially similar to that of the related art.

As will be described below, the service provided to a user by the transaction processing system 1 is a smart POS service. If an information communication terminal attached to a cart is used as the user terminal 300, the service may be referred to as a cart POS service.

For each commodity sold in a store where the smart POS service is provided, whether the commodity can be delivered is determined in advance. For a commodity that can be delivered (a deliverable commodity), a store clerk can make an arrangement for delivery in response to a request from a user. The decision as to which commodities among the commodities sold in the store will be set as a deliverable commodity may be appropriately determined by an administrator (manager) of the store or the like. For example, whether any particular commodity type is deliverable or not can be indicated by individual commodity codes in commodity master data established for the store. Delivery of a deliverable commodity is generally optional, that is the item may be delivered or may be taken away by a user at the time of purchase. In principle, any commodity that is not deliverable must be taken away by a user at the time of purchase.

In order to use the smart POS service, a user performs user registration according to a provider of the smart POS service. For example, when an information processing based on the user terminal program PRC (hereinafter, referred to as a user terminal processing) is executed in the user terminal 300 for the first time, or when a user requests the start of user registration, the processor 301 starts processing for performing user registration. The processor 301 sends a request to the transaction processing device 100 while receiving information input by the user, and adds a new data record REA to the user database DBA stored in the auxiliary storage unit 103. At this time, for example, a user code is decided by the transaction processing device 100. The processor 301 may receive a notification of the user code from the transaction processing device 100 and store the notification in the auxiliary storage unit 303. After the user registration, the user can appropriately register a delivery destination for a commodity. The processing of the processor 101 in the transaction processing device 100 for registering a delivery destination may be the same as performed in, for example, an internet shopping service.

Then, the user carries the user terminal 300 in a state in which a user terminal processing is started, and enters a store where the smart POS service is provided.

The user operates the user terminal 300 to perform a predetermined check-in processing between the user terminal 300 and the transaction processing device 100. When the user completes checking in, the user searches for a commodity that is a transaction target in the store.

In the transaction processing device 100, when the check-in processing is completed by executing an information processing based on the transaction processing program PRA, the processor 101 starts a registration processing based on the transaction processing program PRA. The registration processing is an information processing for registering, as a transaction commodity, a commodity designated by a user. The transaction processing device 100 can execute registration processing for transactions performed by different users in an individual or parallel manner. There can be a plurality of user terminals 300 that are used as user interface terminals by the transaction processing device 100 at the same time. In the following description, the example is focused on processing of a single transaction performed by one user.

FIGS. 8 to 13 are flowcharts illustrating registration processing.

Figure 8:
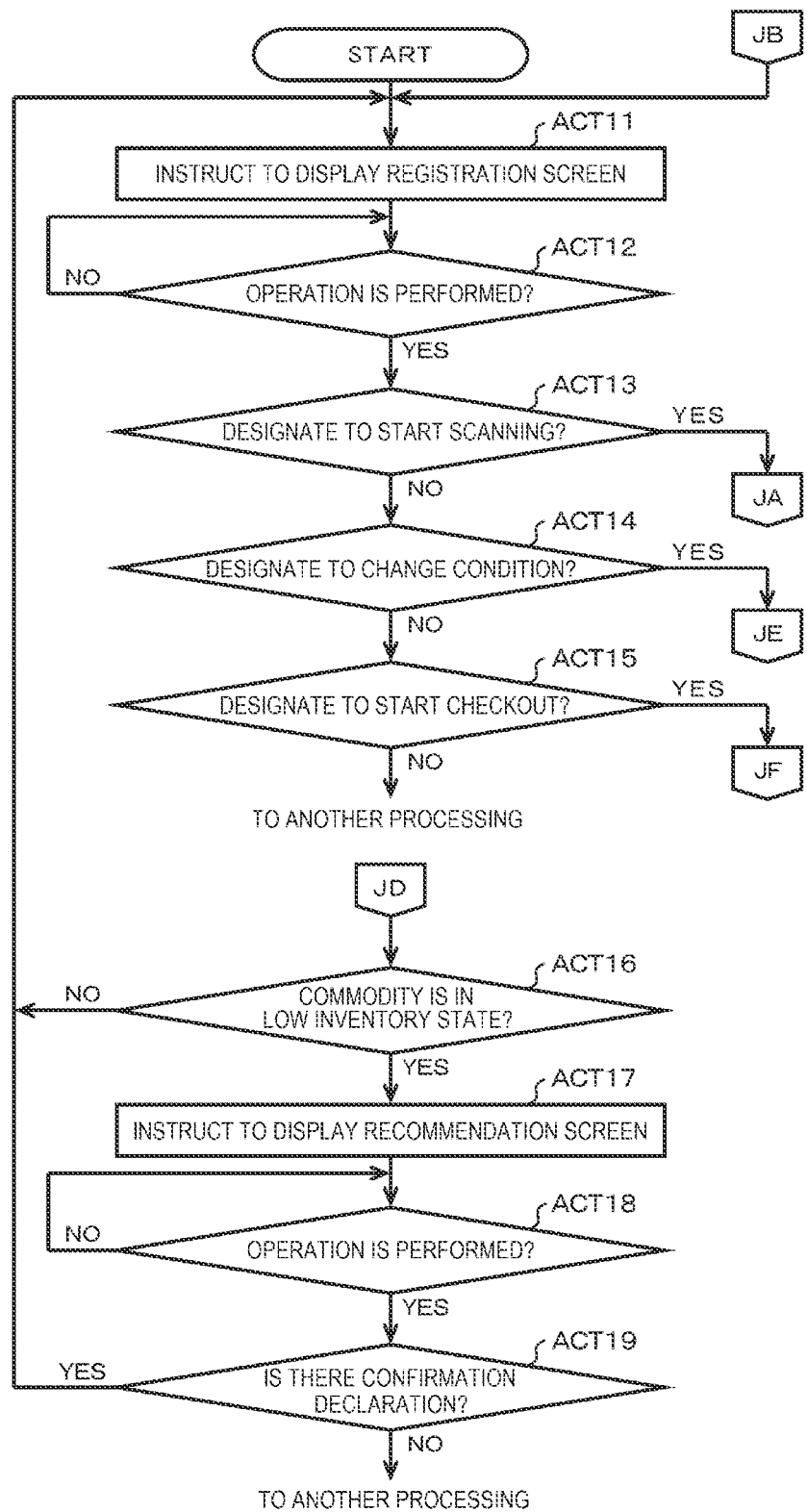
FIGS. 8 to 13 are flowcharts illustrating registration processing executed by a processor.

In ACT 11 in FIG. 8, the processor 101 instructs the user terminal 300 to display a registration screen. The registration screen includes a list of commodities registered as transaction commodities, and is a screen for enabling a user to recognize a registration status of the transaction commodities. For example, the processor 101 generates screen data representing a registration screen reflecting the registration status of the transaction commodities, and transmits instruction data, for instructing the user terminal 300 to display a screen based on the screen data, from the communication unit 104 to the user terminal 300 via the communication network 2.

When the instruction data for instructing to display a screen is transmitted to the user terminal 300 via the communication network 2, the mobile communication unit 306 of the user terminal 300 receives the instruction data. When the mobile communication unit 306 receives the instruction data, the mobile communication unit 306 notifies the processor 301 of the reception of the instruction data. When the instruction data for instructing to display a screen is received, the processor 301 causes the touch panel 304 to display a screen indicated by the screen data included in the instruction data through a user terminal processing.

The transmission and reception of display instructions for various screens to be described below are performed in the same procedure as described above, but contents of screen data are different.

Figure 14:
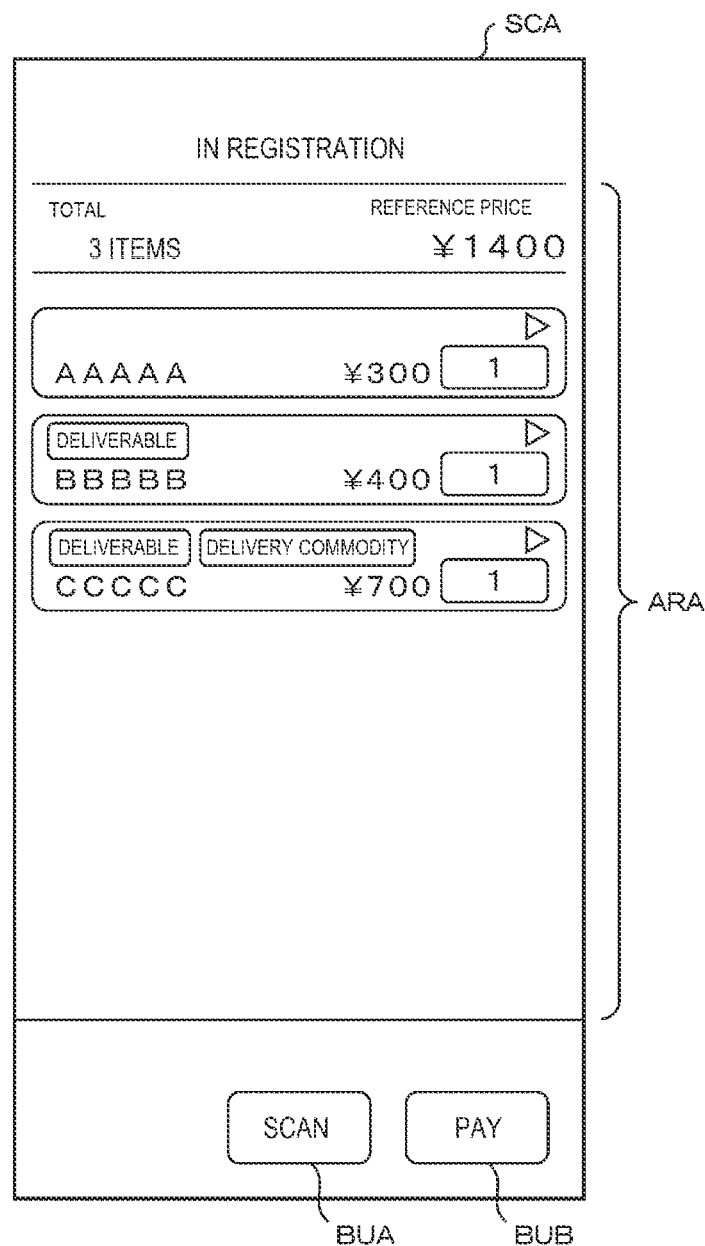
FIG. 14 is a diagram illustrating an example of a registration screen.

FIG. 14 is a diagram illustrating an example of a registration screen SCA.

On the registration screen SCA, an image indicating a registration status is arranged in a display area ARA. Buttons BUA and BUB are displayed on the registration screen SCA. In the example in FIG. 14, the image arranged in the display area ARA indicates a state in which a total of three commodities having commodity names of "AAAAA", "BBBBB", and "CCCCC" and unit prices of 300 yen, 400 yen, and 700 yen are registered and a reference price of the commodities is 1400 yen. The reference price is an amount obtained by subtracting a discount amount of various services such as a coupon service from a total sum of unit prices of all transaction commodities. When a transaction is settled without changing a transaction commodity and a service to be applied, the reference price is a settlement amount. In the example in FIG. 14, the image arranged in the display area ARA indicates that commodities having the commodity names "BBBBB" and "CCCCC" are deliverable commodities. In the example in FIG. 14, the image arranged in the display area ARA indicates that the commodity having the commodity name "CCCCC" is set as a delivery commodity. Images arranged in the display area ARA sequentially change according to a registration status of the transaction commodities. When the processor 101 executes ACT 11 in FIG. 8 for the first time, a transaction commodity is not yet registered. Therefore, on the registration screen SCA indicated by the screen data transmitted to the user terminal 300 when the processor 101 executes ACT 11 in FIG. 8 for the first time, the image arranged in the display area ARA does not indicate information of a commodity, and is an image indicating a total of 0 item and a reference price of 0 yen.

The button BUA is a soft key for receiving an instruction to transition to a state of scanning a new commodity. The button BUB is a soft key for receiving designation of the start of checking out. The registration screen SCA and various screens to be described later illustrate main display objects, and a part of display objects may be omitted.

The processor 301 waits for an operation to be performed on the registration screen SCA by a user in a state in which the registration screen SCA is displayed on the touch panel 304. When an operation is performed on the registration screen SCA, the processor 301 transmits notification data for notifying operation contents from the mobile communication unit 306 to the transaction processing device 100 via the communication network 2. Display of various screens and notification of operation contents based on the screens in response to an instruction from the transaction processing device 100 are all performed in the user terminal processing.

When the notification data for notifying the operation contents is transmitted to the transaction processing device 100 via the communication network 2, the communication unit 104 of the transaction processing device 100 receives the notification data. When the communication unit 104 receives the notification data, the communication unit 104 notifies the processor 101 of the reception of the notification data.

The notification of the operation contents on various screens to be described below is transmitted and received in the same procedure as described above, but operation contents are different.

In ACT 12 in FIG. 8, the processor 101 waits for an operation to be performed on the user terminal 300. For example, when the processor 101 receives a notification from the communication unit 104 that the notification data for notifying the operation contents as described above is received, the processor 101 makes a YES determination and proceeds to ACT 13.

In ACT 13, the processor 101 checks whether the performed operation is an operation designating the start of scanning. If not, the processor 101 makes a NO determination and proceeds to ACT 14.

In ACT 14, the processor 101 checks whether the performed operation is an operation designating a condition change for a registered transaction commodity. If not, the processor 101 makes a NO determination and proceeds to ACT 15.

In ACT 15, the processor 101 checks whether the performed operation is an operation designating the start of checking out. If not, the processor 101 makes a NO determination and proceeds to another processing corresponding to the confirmed operation contents. For example, the processor 101 confirms that an operation of designating a transaction cancellation has been performed, and ends the registration processing after executing the processing for cancelling the transaction.

When a commodity is registered as a new transaction commodity, a user performs a predetermined operation for designating the start of scanning, for example, by tapping the button BUA on the registration screen SCA. When the transaction processing device 100 is notified of such an operation from the user terminal 300, the processor 101 makes a YES determination in ACT 13 and proceeds to ACT 21 in FIG. 9.

In ACT 21, the processor 101 instructs the user terminal 300 to display a commodity scanning screen. The commodity scanning screen is a screen for scanning a barcode indicating a commodity code.

Figure 15:
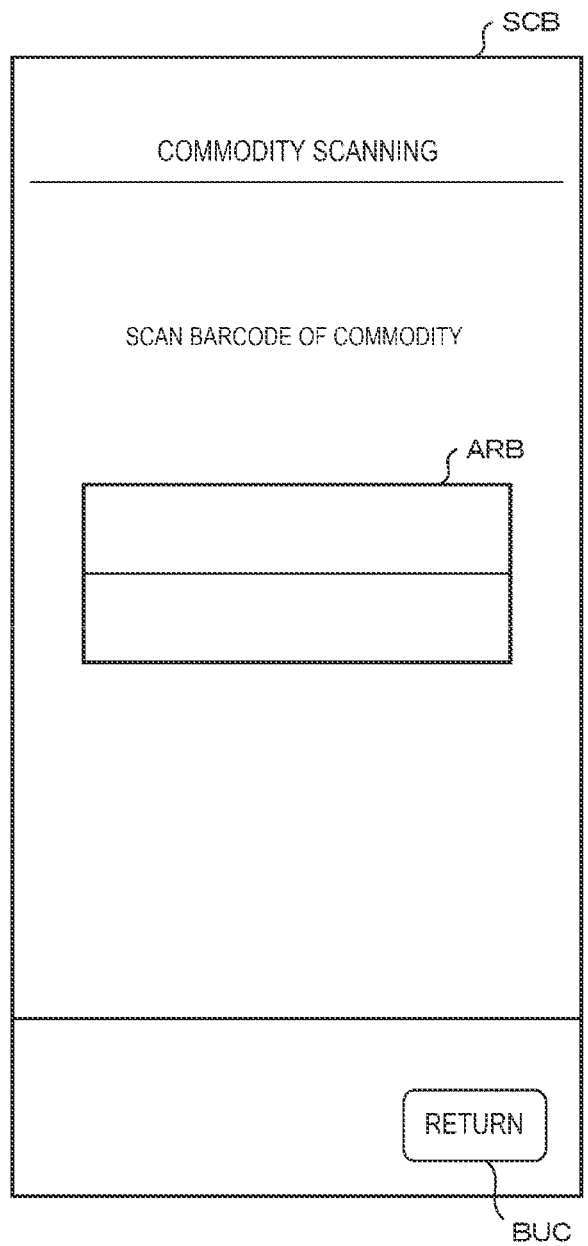
FIG. 15 is a diagram illustrating an example of a commodity scanning screen.

FIG. 15 is a diagram illustrating an example of a commodity scanning screen SCB.

The commodity scanning screen SCB includes a display area ARB and a button BUD. The display area ARB is an area for displaying an image obtained by the camera 305. A button BUC is a soft key for a user to declare that scanning of a commodity code is stopped.

When the commodity scanning screen SCB is displayed, the processor 301 of the user terminal 300 starts up the camera 305 and displays an image obtained by the camera 305 in the display area ARB in a superimposed manner. When an operation is performed on the commodity scanning screen SCB by a user, the processor 301 notifies the transaction processing device 100 of operation contents as will be described later.

Figure 9:
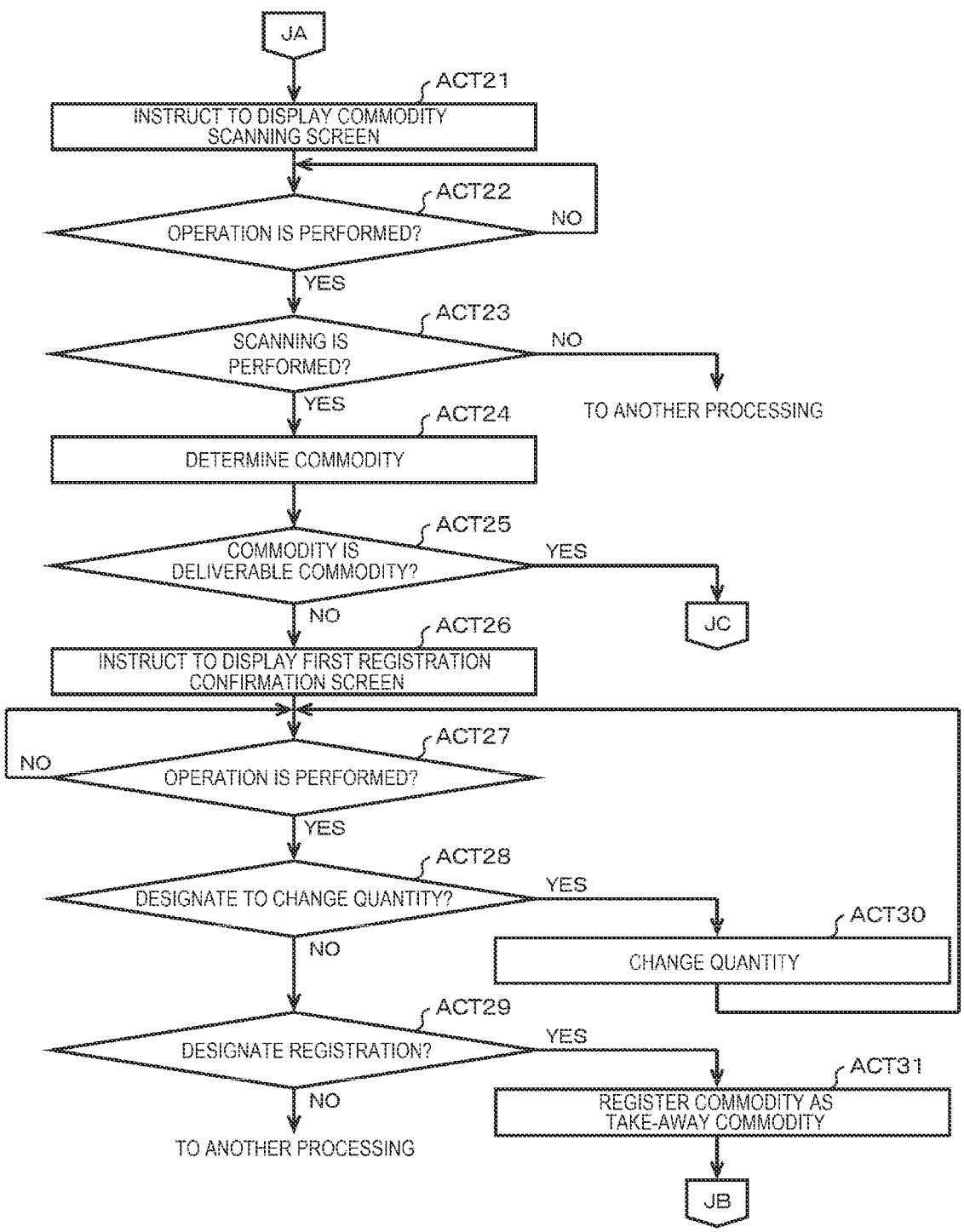

When the processor 101 of the transaction processing device 100 completes an instruction for displaying the commodity scanning screen in ACT 21 in FIG. 9, the processor 101 proceeds to ACT 22.

In ACT 22, the processor 101 waits for an operation to be performed on the user terminal 300. For example, when operation contents are notified from the user terminal 300, the processor 101 makes a YES determination and proceeds to ACT 23.

In ACT 23, the processor 101 checks whether scanning has been performed. If not, the processor 101 makes a NO determination, and proceeds to another processing corresponding to the confirmed operation contents. For example, the processor 101 confirms that an operation of designating to stop scanning, such as tapping the button BUC, has been performed, and the processor 101 returns the processing to ACT 11 in FIG. 8 and returns a display screen on the touch panel 304 of the user terminal 300 to the registration screen SCA.

When the commodity scanning screen SCB is displayed on the touch panel 304, the user directs the camera 305 to a commodity to be registered as a transaction commodity so as to reflect a barcode displayed on the commodity in the display area ARB. The processor 301 analyzes an image obtained by the camera 305 and attempts to read the barcode. When the barcode is read, the processor 301 notifies the transaction processing device 100 that scanning is performed accompanying with a notification for notifying data indicated by the read barcode (hereinafter, referred to as barcode data).

In response to the notification from the user terminal 300 as described above, the processor 101 of the transaction processing device 100 makes a YES determination in ACT 23 in FIG. 9 and proceeds to ACT 24.

In ACT 24, the processor 101 determines a commodity to be registered as a transaction commodity based on the notified barcode data. That is, for example, the processor 101 extracts a commodity code included in the barcode data, and determines the commodity identified by the commodity code as a commodity to be registered as a transaction commodity (hereinafter, referred to as a candidate commodity). The processor 101 may receive, for example, a notification from the user terminal 300 indicating that an operation of tapping a preset button displayed on the touch panel 304 is performed, and determine a commodity assigned to the preset button as a candidate commodity. The processor 101 may receive, for example, a notification from the user terminal 300 indicating a commodity code that is directly input on the touch panel 304 as a numerical value sequence, and determine a commodity identified by the commodity code as a candidate commodity. Thus, the processor 101 executes an information processing based on the transaction processing program PRA, thereby causing the processor 101 to function as a determination unit. The camera 305 functions as a unit configured to input a commodity code by scanning, and the touch panel 304 functions as a unit configured to input a commodity code by performing a tapping operation.

In ACT 25, the processor 101 confirms whether the candidate commodity determined as described above is a deliverable commodity. When the candidate commodity is not a deliverable commodity, the processor 101 makes a NO determination and proceeds to ACT 26.

In ACT 26, the processor 101 instructs the user terminal 300 to display a first registration confirmation screen. The first registration confirmation screen is a screen for confirming whether to register a candidate commodity that cannot be delivered as a transaction commodity.

Figure 16:
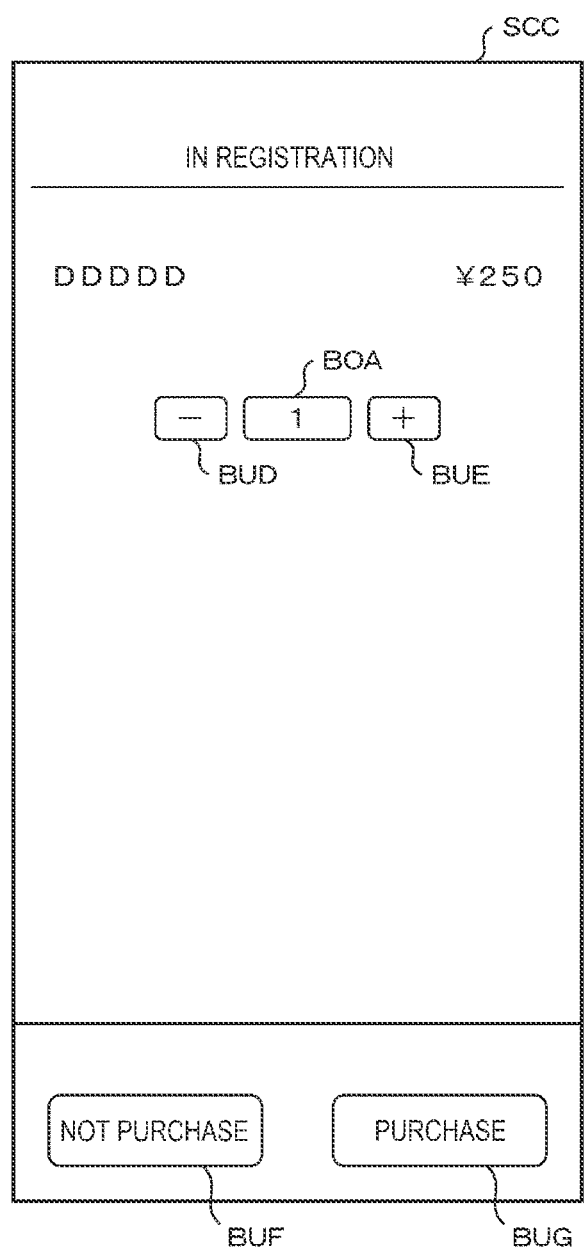
FIG. 16 is a diagram illustrating an example of a first registration confirmation screen.

FIG. 16 is a diagram illustrating an example of a first registration confirmation screen SCC.

The first registration confirmation screen SCC illustrated in FIG. 16 shows an example in a case where a candidate commodity is a commodity having a commodity name of "DDDDD" and a unit price of 250 yen. A display box BOA and buttons BUD, BUE, BUF, and BUG are displayed on the first registration confirmation screen SCC. A quantity is displayed in the display box BOA. The button BUD is a soft key for receiving a designation of reducing the quantity. The button BUE is a soft key for receiving a designation of increasing the quantity. The button BUF is a soft key for receiving a designation indicating that a commodity is not registered as a transaction commodity. The button BUG is a soft key for receiving a designation indicating that a commodity is registered as a transaction commodity.

In ACT 27 in FIG. 9, the processor 101 waits for an operation to be performed on the user terminal 300. For example, when operation contents are notified from the user terminal 300, the processor 101 makes a YES determination and proceeds to ACT 28.

In ACT 28, the processor 101 confirms whether there is a designation of changing the quantity. If not, the processor 101 makes a NO determination and proceeds to ACT 29.

In ACT 29, the processor 101 checks whether there is a designation indicating that a commodity has been registered as a transaction commodity. If not, the processor 101 makes a NO determination and proceeds to another processing. For example, the processor 101 confirms that a predetermined operation for designating to cancel a registration such as tapping the button BUF has been performed, and returns the processing to ACT 21.

When a user wants to change the quantity, the user designates a quantity change by performing a predetermined operation such as tapping the button BUD or the button BUE. When such an operation is notified from the user terminal 300, the processor 101 makes a YES determination in ACT 28 and proceeds to ACT 30.

In ACT 30, the processor 101 changes the quantity according to the designation. Then, the processor 101 returns to a standby state in ACT 27.

When a user decides to register a candidate commodity displayed on the first registration confirmation screen SCC as a transaction commodity by the quantity displayed in the display box BOA, the user designates the registration by performing a predetermined operation such as tapping the button BUG. When such an operation is notified from the user terminal 300, the processor 101 makes a YES determination in ACT 29 and proceeds to ACT 31.

In ACT 31, the processor 101 registers the candidate commodity as a take-away commodity by the quantity displayed in the display box BOA. In this context, a take-away commodity refers to a transaction commodity that will be taken away by a user from a store instead of being delivered. For example, the processor 101 updates the transaction data DAA so as to include the commodity data DAB in which the commodity code of the candidate commodity and the quantity displayed in the display box BOA are respectively set in the fields FCA and FCB. The processor 101 sets a delivery flag value indicating that the commodity is not a delivery target in the field FCC of the commodity data DAB, and does not set delivery destination information in the field FCD. Thereafter, the processor 101 returns to ACT 11 in FIG. 8, instructs the user terminal 300 to display the registration screen SCA according to the transaction data updated as described above, and then returns to a standby state in ACT 12.

Figure 10:
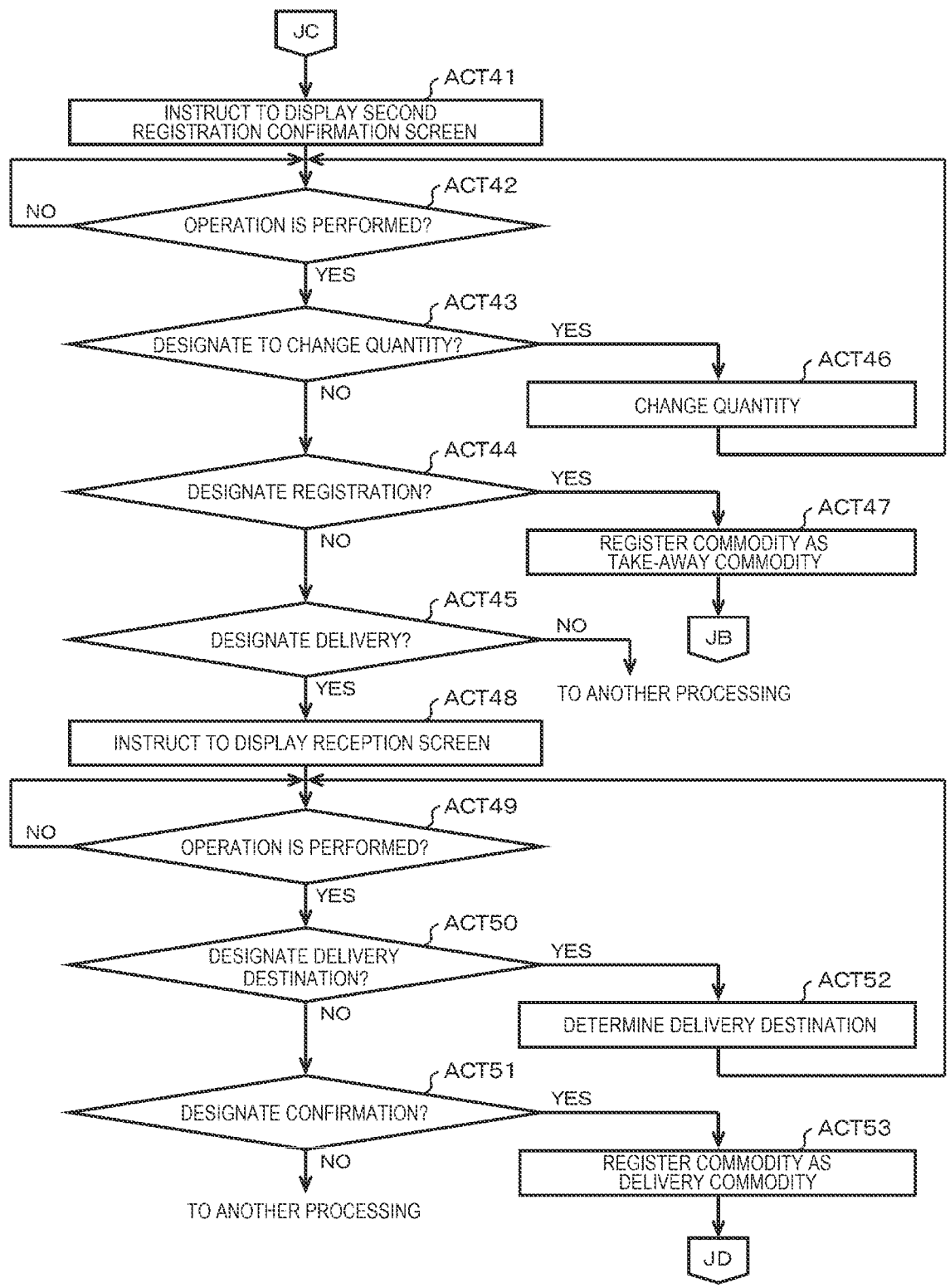
Figure 11:
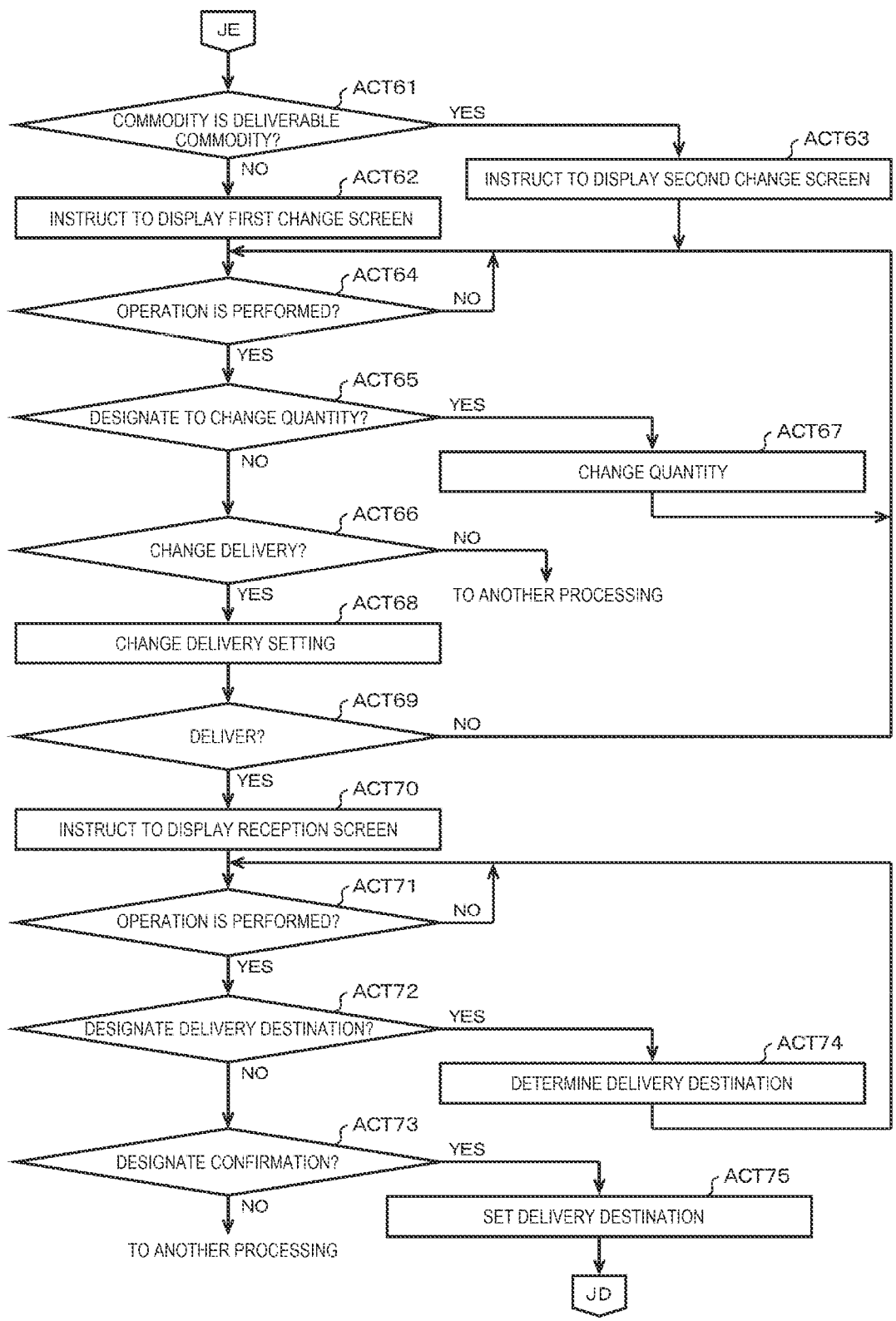

When the candidate commodity determined (identified) in ACT 24 in FIG. 9 is a deliverable commodity, the processor 101 makes a YES determination in ACT 25 and proceeds to ACT 41 in FIG. 10.

In ACT 41, the processor 101 instructs the user terminal 300 to display a second registration confirmation screen. The second registration confirmation screen is a screen for confirming whether to register a deliverable candidate commodity as a transaction commodity.

Figure 17:
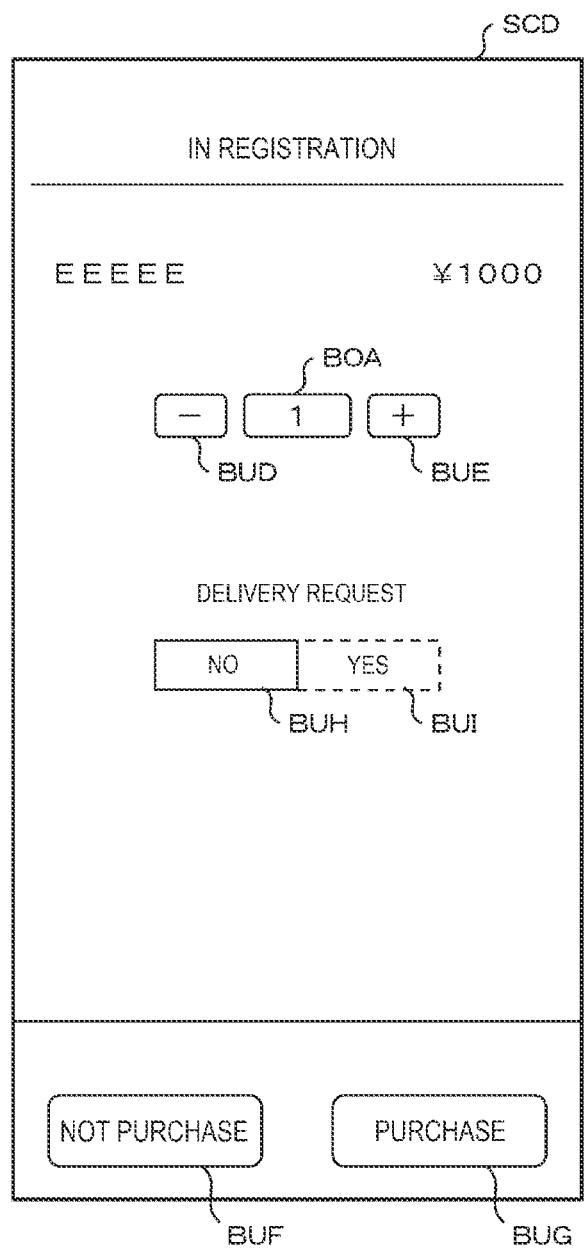
FIG. 17 is a diagram illustrating an example of a second registration confirmation screen.

FIG. 17 is a diagram illustrating an example of a second registration confirmation screen SCD. In FIG. 17, the same reference symbols are given to the same display elements as those illustrated in FIG. 16, and detailed description thereof will be omitted.

The second registration confirmation screen SCD is a screen on which buttons BUH and BUI are added to the first registration confirmation screen SCC. The button BUH is a soft key for receiving a designation indicating that a candidate commodity is not set as a delivery target. The button BUI is a soft key for receiving a designation indicating that a candidate commodity is set as a delivery target. The buttons BUH and BUI are also display objects showing a current setting status indicating whether a candidate commodity is a delivery target. That is, in the example in FIG. 17, the button BUI is grayed out to indicate a setting in which a candidate commodity is not set as a delivery target.

The first registration confirmation screen SCC and the second registration confirmation screen SCD may be a common registration confirmation screen such as the second registration confirmation screen SCD. In this case, for example, in ACT 26 in FIG. 9, the processor 101 invalidates the buttons BUH and BUI, and indicates that an operation cannot be performed using a gray out display or the like.

In a situation in which a candidate commodity is not set as a delivery target, when a user decides to set the candidate commodity as a delivery target, the user designates the candidate commodity as a delivery target by performing a predetermined operation such as tapping the button BUI. In a situation in which a candidate commodity is set as a delivery target, when a user decides not to set the candidate commodity as a delivery target, the user designates not to set the candidate commodity as a delivery target by performing a predetermined operation such as tapping the button BUH.

In ACT 42, the processor 101 waits for an operation to be performed on the user terminal 300. For example, when operation contents are notified from the user terminal 300, the processor 101 makes a YES determination and proceeds to ACT 43.

In ACT 43, the processor 101 confirms whether there has been a designation of changing the quantity. If not, the processor 101 makes a NO determination and proceeds to ACT 44.

In ACT 44, the processor 101 checks whether there is a designation indicating that a commodity has been registered as a transaction commodity. If no, the processor 101 makes a NO determination and proceeds to ACT 45.

In ACT 45, the processor 101 checks whether there has been a designation for delivery. If not, the processor 101 makes a NO determination and proceeds to another processing. For example, the processor 101 confirms that a predetermined operation for designating to cancel a registration such as tapping the button BUF has been performed, and returns to ACT 21 in FIG. 9.

When a user wants to change the quantity, the user designates a quantity change by performing a predetermined operation such as tapping the button BUD or the button BUE. When such an operation is notified from the user terminal 300, the processor 101 makes a YES determination in ACT 43 and proceeds to ACT 46.

In ACT 46, the processor 101 changes the quantity according to the designation. Then, the processor 101 returns the processing to a standby state in ACT 42.

When a user decides to register a candidate commodity displayed on the second registration confirmation screen SCD as a take-away transaction commodity by the quantity displayed in the display box BOA, the user designates the registration by performing a predetermined operation such as tapping the button BUG. When such an operation is notified from the user terminal 300, the processor 101 makes a YES determination in ACT 44 and proceeds to ACT 47.

In ACT 47, the processor 101 registers the candidate commodity as a take-away commodity in a similar manner to that in ACT 31 in FIG. 9. Thereafter, the processor 101 returns the processing to ACT 11 in FIG. 8, instructs the user terminal 300 to display the registration screen SCA according to the transaction data updated as described above, and then returns the processing to a standby state in ACT 12.

When a user decides to request a store to deliver the candidate commodity displayed on the second registration confirmation screen SCD, the user designates delivery by performing a predetermined operation such as tapping the button BUI in FIG. 17. When such an operation is notified from the user terminal 300, the processor 101 makes a YES determination in ACT 45 in FIG. 10 and proceeds to ACT 48.

In ACT 48, the processor 101 instructs the user terminal 300 to display a reception screen. The reception screen is a screen for receiving designation of a delivery destination.

Figure 18:
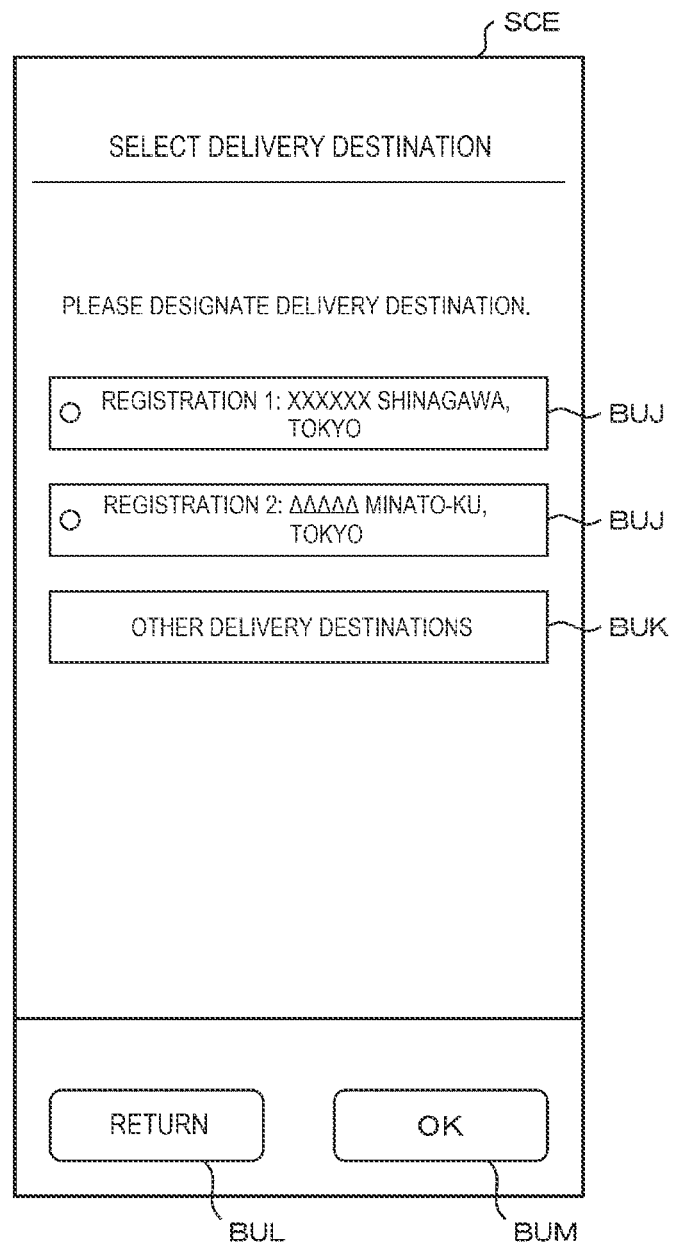
FIG. 18 is a diagram illustrating an example of a reception screen.

FIG. 18 is a diagram illustrating an example of a reception screen SCE.

The reception screen SCE illustrated in FIG. 18 shows an example of a situation in which two delivery destinations are registered in the user database DBA for a user.

Buttons BUJ, BUK, BUL, and BUM are displayed on the reception screen SCE. The button BUJ is a soft key for receiving designation of a delivery destination registered in the user database DBA. The number of buttons BUJ displayed on the reception screen SCE changes according to the number of delivery destinations registered in the user database DBA. FIG. 18 shows an example of a situation in which two delivery destinations are registered in the user database DBA, and thus two buttons BUJ are displayed. In areas of the buttons BUJ, character strings for the user to distinguish delivery destinations are displayed. When no delivery destination is registered in the user database DBA, the processor 101 sets the reception screen SCE to a screen on which no button BUJ is displayed.

The button BUK is a soft key for receiving an instruction of the user to proceed to designation of a delivery destination different from the delivery destination registered in the user database DBA. The button BUL is a soft key for receiving a designation of stopping delivery. The button BUM is a soft key for receiving a designation of confirming a delivery destination.

In ACT 49, the processor 101 waits for an operation to be performed on the user terminal 300. For example, when operation contents are notified from the user terminal 300, the processor 101 makes a YES determination and proceeds to ACT 50.

In ACT 50, the processor 101 checks whether a delivery destination has been designated. If not, the processor 101 makes a NO determination and proceeds to ACT 51.

In ACT 51, the processor 101 checks whether confirmation has been designated. If not, the processor 101 makes a NO determination and proceeds to another processing corresponding to the confirmed operation contents. For example, the processor 101 confirms that a predetermined operation for designating to cancel delivery such as tapping the button BUL has been performed, and returns to ACT 41.

A user designates a delivery destination of a candidate commodity by performing a predetermined operation on the reception screen SCE. For example, when the user designates a delivery destination registered in the user database DBA, the user taps the button BUJ indicating the corresponding delivery destination. For example, when the user designates a delivery destination that is not registered, the user taps the button BUK. When such an operation is notified from the user terminal 300, the processor 101 makes a YES determination in ACT 50 and proceeds to ACT 52.

In ACT 52, the processor 101 determines the delivery destination of the candidate commodity according to the designation. For example, when the button BUJ is tapped, the processor 101 determines a delivery destination linked to the tapped button BUJ as a delivery destination of a candidate commodity. For example, when the button BUK is tapped, thereafter, the processor 101 enables the user to use the user terminal 300 to designate an address, and determines the designated address as a delivery destination of a candidate commodity. Then, the processor 101 returns to a standby state in ACT 49.

The user can correct the delivery destination of the candidate commodity by performing an operation for designating a delivery destination again. In this case, the processor 101 repeats ACT 52 a plurality of times, and sets a delivery destination determined in finally executed ACT 52 as a delivery destination of a candidate commodity.

When the user finishes designating the delivery destination of the candidate commodity, the user designates confirmation by performing a predetermined operation such as tapping the button BUM. When such an operation is notified from the user terminal 300, the processor 101 makes a YES determination in ACT 51 and proceeds to ACT 53.

In ACT 53, the processor 101 registers the candidate commodity as a delivery commodity by the quantity displayed in the display box BOA. The delivery commodity refers to a transaction commodity for which a store clerk of a store arranges delivery to a designated delivery destination. For example, the processor 101 updates the transaction data so as to include the commodity data DAB in which the commodity code of the candidate commodity and the quantity displayed in the display box BOA are respectively set in the fields FCA and FCB. The processor 101 sets a delivery flag indicating that the commodity is a delivery target in the field FCC of the commodity data DAB, and sets delivery destination information indicating the delivery destination determined in ACT 52 in the field FCD. Then, the processor 101 proceeds to ACT 16 in FIG. 8. Thus, the processor 101 executes an information processing based on the transaction processing program PRA, thereby causing the processor 101 to function as a decision unit and a registration unit.

For a take-away commodity, the user picks up the commodity by the registered quantity from a sales area and takes the commodity away. For a delivery commodity, the user may pick up all or a part of the commodities from a sales area and take the commodities away, and may not pick up the commodity at all.

In ACT 16, the processor 101 confirms whether a commodity registered as a delivery commodity is in a low inventory state. The low inventory state is a state in which, when a user does not pick up a delivery commodity from a sales area, there is a possibility that the corresponding commodity will be sold out in a period up to when a store clerk makes an arrangement for delivery. An administrator of a store or the like may appropriately determine whether to set an inventory state of a delivery commodity to a low inventory state when the inventory state of the delivery commodity is in a certain state. For example, for a commodity that can be delivered, in a store in which an inventory for delivery is reserved in a store warehouse, it is assumed that a state in which the number of inventories for delivery is smaller than a predetermined number is set as a low inventory state. For example, it is assumed that the number of commodities displayed in a sales area is monitored, and a state in which the number is smaller than a predetermined number is set as a low inventory state. For example, it is assumed that a total number of commodities in a store is monitored, and a state in which the number is smaller than a predetermined number is set as a low inventory state. When it is confirmed that a commodity is not in a low inventory state, the processor 101 makes a NO determination, and returns to ACT 11 in FIG. 8. The processor 101 instructs the user terminal 300 to display the registration screen SCA according to the transaction data updated as described above, and then returns to a standby state in ACT 12.

Figure 19:
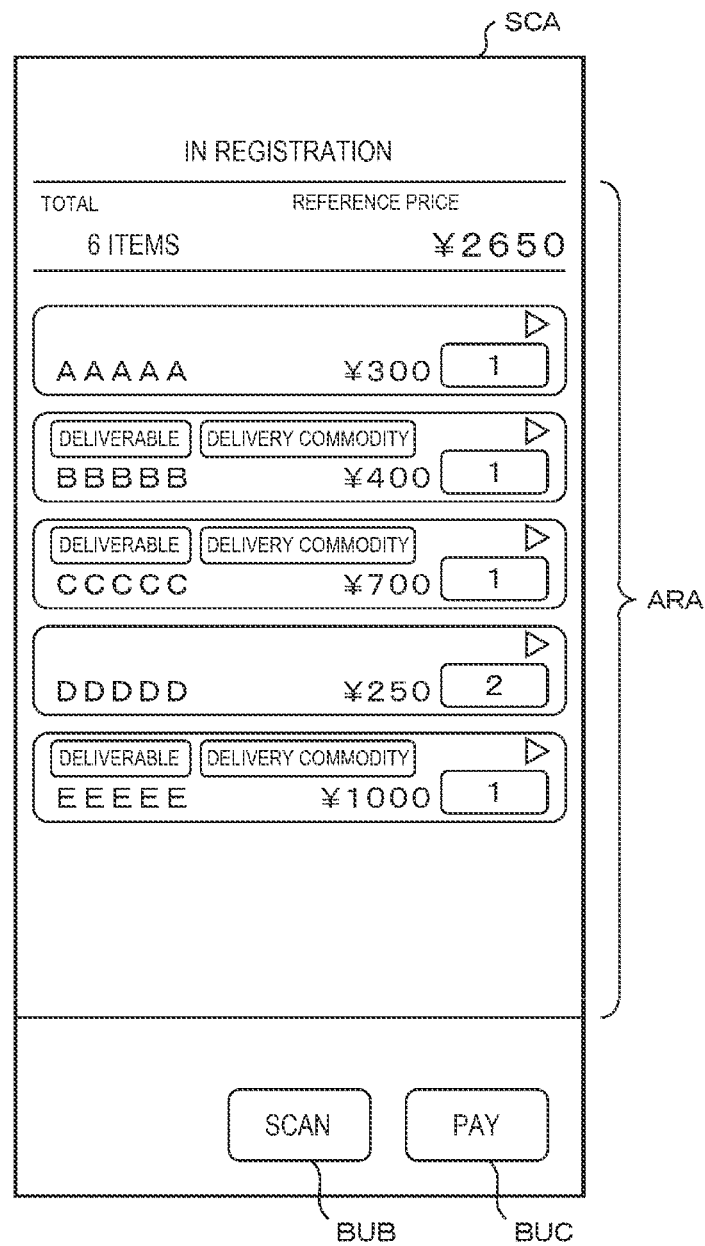
FIG. 19 is a diagram illustrating an example of a registration screen.

FIG. 19 is a diagram illustrating an example of a registration screen SCA.

The registration screen SCA illustrated in FIG. 19 shows an example in which after the registration screen SCA illustrated in FIG. 14 is displayed on the user terminal 300, two commodities having a commodity name of "DDDDD" and a unit price of 250 yen are registered as take-away commodities, and one commodity having a commodity name of "EEEEE" and a unit price of 1000 yen is registered as a delivery commodity.

When the processor 11 confirms that a commodity is in a low inventory state, the processor 101 makes a YES determination in ACT 16 and proceeds to ACT 17.

In ACT 17, the processor 101 instructs the user terminal 300 to display a recommendation screen. The recommendation screen is a screen for notifying a user that it is recommended to pick up a commodity previously registered as a delivery commodity from a sales area.

Figure 20:
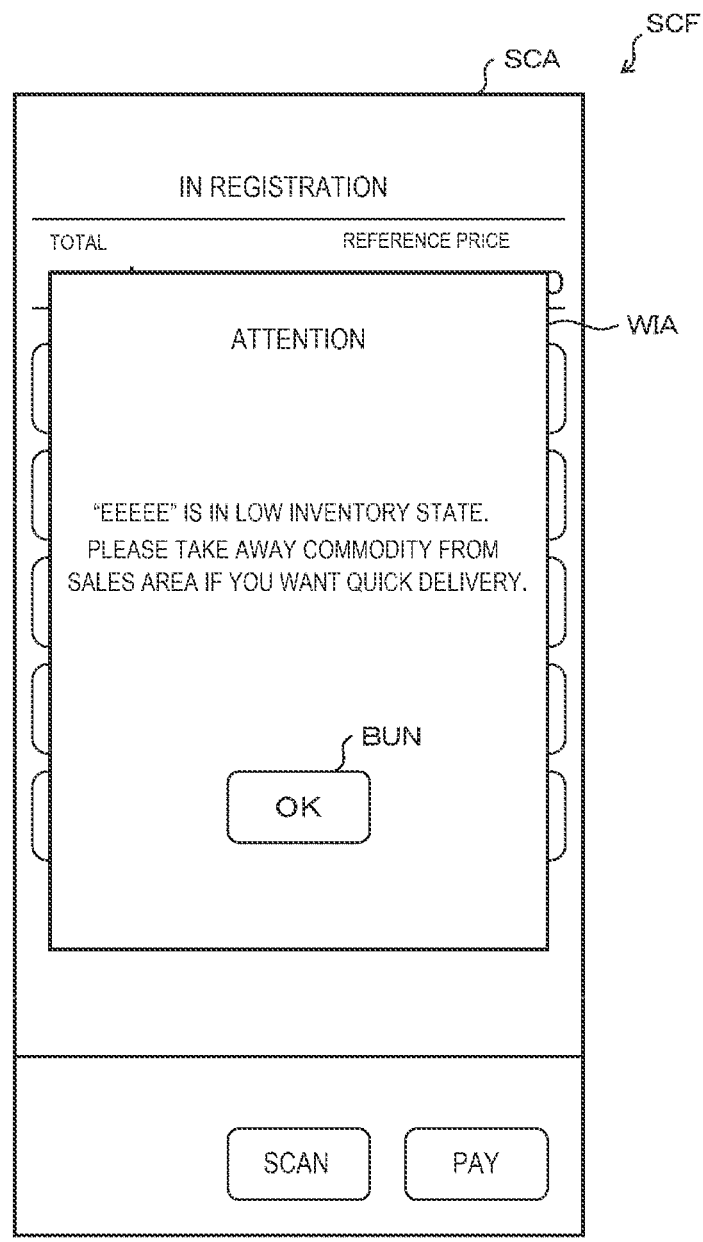
FIG. 20 is a diagram illustrating an example of a recommendation screen.

FIG. 20 is a diagram illustrating an example of a recommendation screen SCF.

The recommendation screen SCF is a screen for displaying a window WIA superimposed on the registration screen SCA. A text message for recommending a user to pick up a commodity registered as a delivery commodity from a sales area is displayed on the window WIA. A button BUN is displayed on the window WIA. The button BUN is a soft key for receiving a declaration of a user that notification on the recommendation screen SCF is confirmed.

Thus, the processor 101 executes an information processing based on the transaction processing program PRA, thereby causing the processor 101 to function as a notification unit.

In ACT 18 in FIG. 8, the processor 101 waits for an operation to be performed on the user terminal 300. For example, when operation contents are notified from the user terminal 300, the processor 101 makes a YES determination and proceeds to ACT 19.

In ACT 19, the processor 101 checks whether the declaration indicating confirmation has been made. If not, the processor 101 makes a NO determination and proceeds to another processing.

When the user confirms notification contents on the recommendation screen SCF, the user appropriately decides whether to pick up a corresponding commodity. Then, it is declared that confirmation is made by performing a predetermined operation such as tapping the button BUN. When such an operation is notified from the user terminal 300, the processor 101 makes a YES determination in ACT 19 and returns to ACT 11. The processor 101 instructs the user terminal 300 to display the registration screen SCA according to the transaction data updated as described above, and then returns to a standby state in ACT 12.

When a user wants to change a condition for a registered commodity, for example, the user designates a condition change by performing a predetermined operation such as tapping a triangular display object displayed in association with a transaction commodity on the registration screen SCA. When such an operation is notified from the user terminal 300, the processor 101 makes a YES determination in ACT 14 in FIG. 8, and proceeds to ACT 61 in FIG. 11.

In ACT 61, the processor 101 confirms whether a commodity for which a condition change is designated is a deliverable commodity. When it is confirmed that the commodity is not a deliverable commodity, the processor 101 makes a NO determination and proceeds to ACT 62, and when it is confirmed that the commodity is a deliverable commodity, the processor 101 makes a YES determination and proceeds to ACT 63.

In ACT 62, the processor 101 instructs the user terminal 300 to display a first change screen. The first change screen is a screen for receiving a designation from a user for changing a condition for a commodity that is not a deliverable commodity. The first change screen may be, for example, a screen similar to the first registration confirmation screen SCC illustrated in FIG. 16. Instead of the buttons BUF and BUG, the first change screen displays a button for receiving a designation of cancelling a change and a button for receiving a designation of making a change.

In ACT 63, the processor 101 instructs the user terminal 300 to display a second change screen. The second change screen is a screen for receiving a designation from a user for changing a condition for a deliverable commodity. The second change screen may be, for example, a screen similar to the second registration confirmation screen SCD illustrated in FIG. 17. Instead of the buttons BUF and BUG, the second change screen displays a button for receiving a designation of cancelling a change and a button for receiving a designation of making a change.

When a display instruction in ACT 62 or ACT 63 is ended, the processor 101 proceeds to ACT 64 in any case.

In ACT 64, the processor 101 waits for an operation to be performed on the user terminal 300. For example, when operation contents are notified from the user terminal 300, the processor 101 makes a YES determination and proceeds to ACT 65.

In ACT 65, the processor 101 checks whether there has been a designation of changing the quantity. If not, the processor 101 makes a NO determination and proceeds to ACT 66.

In ACT 66, the processor 101 checks whether there has been a designation for a change related to whether a commodity is a delivery target. If not, the processor 101 makes a NO determination and proceeds to another processing corresponding to the confirmed operation contents. For example, the processor 101 checks whether a predetermined operation for designating to cancel a change has been performed, and returns to ACT 11 in FIG. 8.

When a user wants to change the quantity, the user designates a quantity change by performing a predetermined operation such as tapping the button BUD or the button BUE. When such an operation is notified from the user terminal 300, the processor 101 makes a YES determination in ACT 65 and proceeds to ACT 67.

In ACT 67, the processor 101 changes the quantity according to the designation. Then, the processor 101 returns to a standby state in ACT 64.

For a setting of not delivering a deliverable commodity, when a user wants to change the setting to a setting of delivering the deliverable commodity, the user designates a setting change by performing a predetermined operation such as tapping a button corresponding to the button BUI in FIG. 17 on the second change screen. For a setting of delivering a deliverable commodity, when a user wants to change the setting to a setting of not delivering the deliverable commodity, the user designates a setting change by performing a predetermined operation such as tapping a button corresponding to the button BUH in FIG. 17 on the second change screen. When such an operation is notified from the user terminal 300, the processor 101 makes a YES determination in ACT 66 and proceeds to ACT 68.

In ACT 68, the processor 101 changes the setting as to whether a commodity which is a setting change target is set as a delivery target. Specifically, for example, the processor 101 inverts a state of the delivery flag set in the field FCC of the commodity data DAB associated with the commodity which is a setting change target in the transaction data DAA. At this time, the processor 101 updates the second change screen displayed on the user terminal 300 so as to indicate the changed setting.

In ACT 69, the processor 101 confirms whether the changed setting is a setting of delivering a commodity. When the changed setting is a setting of not delivering a commodity, the processor 101 makes a NO determination and returns to a standby state in ACT 64.

When the changed setting is a setting of delivering a commodity, the processor 101 makes a YES determination in ACT 69 and proceeds to ACT 70.

In ACT 70, the processor 101 instructs the user terminal 300 to display a reception screen. The reception screen here may be the same screen as the reception screen SCE illustrated in FIG. 18.

In ACT 71, the processor 101 waits for an operation to be performed on the user terminal 300. For example, when operation contents are notified from the user terminal 300, the processor 101 makes a YES determination and proceeds to ACT 72.

In ACT 72, the processor 101 checks whether a delivery destination has been designated. If not, the processor 101 makes a NO determination and proceeds to ACT 73.

In ACT 73, the processor 101 checks whether confirmation has been designated. If not, the processor 101 makes a NO determination, and proceeds to another processing for performing a processing corresponding to the confirmed operation contents.

A user designates a delivery destination of a candidate commodity by performing a predetermined operation on the reception screen. For example, when the user designates a delivery destination registered in the user database DBA, the user taps the button BUJ indicating the corresponding delivery destination. For example, when the user designates a delivery destination that is not registered, the user taps the button BUK. When such an operation is notified from the user terminal 300, the processor 101 makes a YES determination in ACT 72 and proceeds to ACT 74.

In ACT 74, the processor 101 determines the delivery destination of the candidate commodity according to the designation in a similar manner to that in ACT 52 in FIG. 10. Then, the processor 101 returns to a standby state in ACT 71.

When the user finishes designating the delivery destination of the candidate commodity, the user designates confirmation by performing a predetermined operation such as tapping the button BUM. When such an operation is notified from the user terminal 300, the processor 101 makes a YES determination in ACT 73 and proceeds to ACT 75.

In ACT 75, the processor 101 sets the delivery destination determined as described above as a delivery destination for a commodity which is a change target. Specifically, for example, the processor 101 sets delivery destination information indicating the delivery destination determined as described above in the field FCD of the commodity data DAB associated with a commodity which is a setting change target in the transaction data DAA. Thereafter, the processor 101 executes ACT 16 and subsequent acts in FIG. 8 in the same manner as described above.

When a user completes registration for all transaction commodities in a current transaction and also completes a delivery setting, the user designates the start of checking out by performing a predetermined operation such as tapping the button BUB on the registration screen SCA. When such an operation is notified from the user terminal 300, the processor 101 makes a YES determination in ACT 15 in FIG. 8, and proceeds to ACT 81 in FIG. 12.

In ACT 81, the processor 101 instructs the user terminal 300 to display a checkout screen. The checkout screen is a screen for handing a checkout processing for a transaction to be processed over to the checkout device 200. A barcode indicating information necessary for the checkout device 200 to make an inquiry of the transaction to the transaction processing device 100 is displayed on the checkout screen.

When a plurality of checkout devices 200 are installed in a store, a user freely selects the checkout device 200 that is not used from the plurality of checkout devices 200, and causes the barcode scanner 205 provided in the checkout device 200 to read the barcode displayed on the checkout screen. Then, the processor 201 of the checkout device 200 requests checkout data from the transaction processing device 100 based on information indicated by the barcode read by the barcode scanner 205.

In ACT 82, the processor 101 waits for the checkout data request from the checkout device 200. When the checkout data is requested as described above, the processor 101 makes a YES determination and proceeds to ACT 83.

In ACT 83, the processor 101 transmits, to the checkout device 200 which is a request source, the checkout data for causing the checkout device 200 to settle a transaction to be processed.

In this manner, the processor 201 of the checkout device 200 receives an operation from a user during checking out while appropriately displaying a screen on the touch panel 204 according to the checkout data transmitted from the transaction processing device 100. The operation received by the processor 201 here includes a designation of a setting change for delivery and a designation of performing checking out. When a predetermined operation including these designations is performed, the processor 201 notifies the transaction processing device 100 of such an operation.

Figure 12:
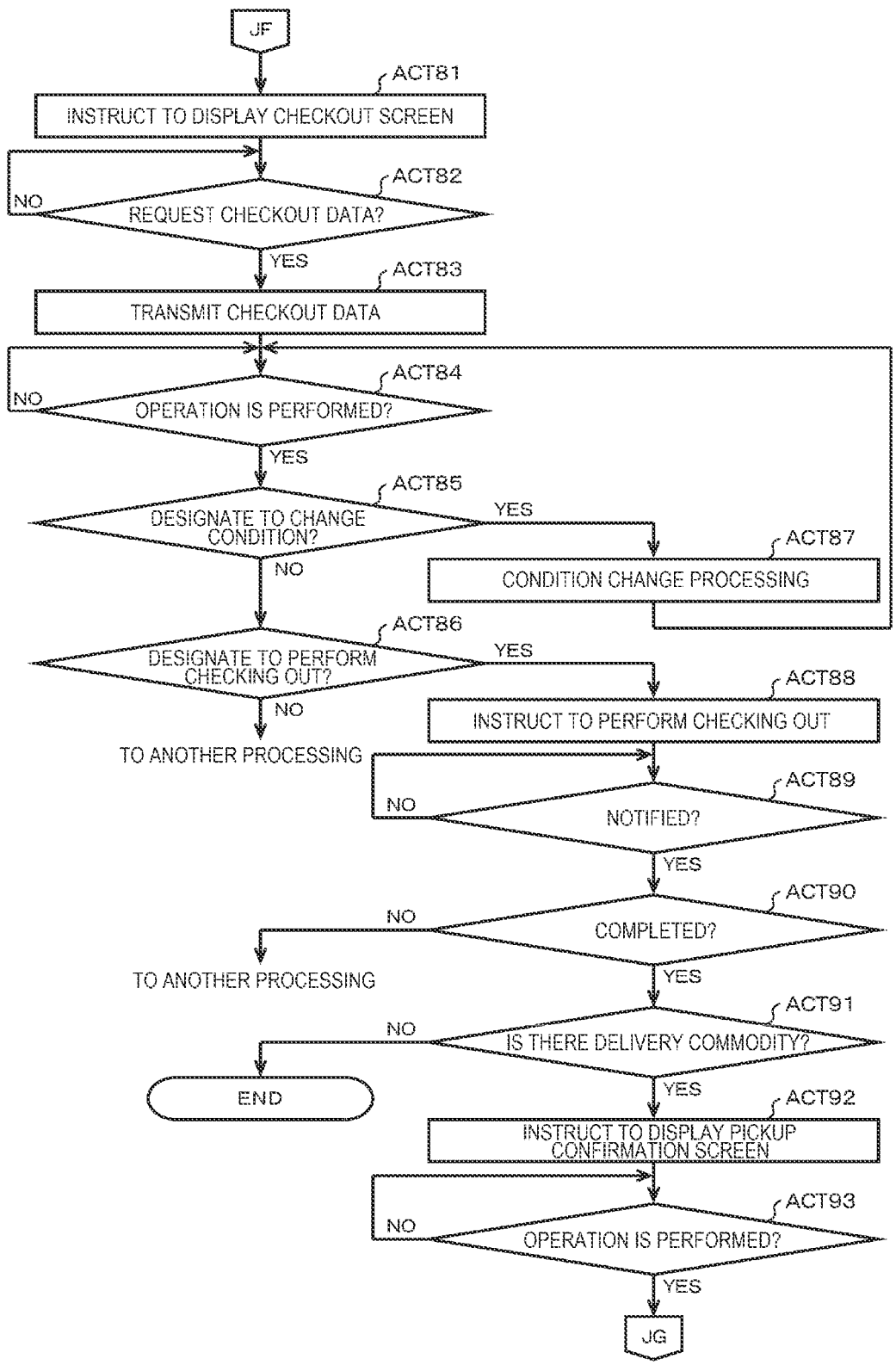

The processor 101 of the transaction processing device 100 proceeds to ACT 84 after transmitting the checkout data in ACT 83 in FIG. 12.

In ACT 84, the processor 101 waits for an operation to be performed on the checkout device 200. For example, when the operation is notified from the checkout device 200, the processor 101 makes a YES determination and proceeds to ACT 85.

In ACT 85, the processor 101 checks whether the performed operation is an operation designating to change a condition for delivery of a transaction commodity. If not, the processor 101 makes a NO determination and proceeds to ACT 86.

In ACT 86, the processor 101 checks whether the performed operation is an operation of designating to perform checking out. If not, the processor 101 makes a NO determination, confirms operation contents, and proceeds to another processing for performing a processing corresponding to the confirmed operation contents. Detailed description of the other processing will be omitted here.

When the operation of designating to change a condition for delivery of a transaction commodity is notified from the checkout device 200, the processor 101 makes a YES determination in ACT 85 and proceeds to ACT 87.

In ACT 87, the processor 101 executes processing for changing a condition for delivery of a transaction commodity. For example, this processing may be executed by using the checkout device 200 as a user interface terminal in a similar manner to the processing in FIG. 11 and the processing in ACT 16 and acts after ACT 16 in FIG. 8. A display screen may be changed according to a display on the checkout device 200. Then, once the processing is completed, the processor 101 returns to a standby state in ACT 84.

When the operation designating to perform checking out is notified from the checkout device 200, the processor 101 makes a YES determination in ACT 86 and proceeds to ACT 88.

In ACT 88, the processor 101 instructs the checkout device 200 to perform checking out. When the checkout device 200 receives the instruction, the processor 201 executes a processing for performing checking out for a transaction. The processing of the processor 201 may be, for example, a processing similar to a processing performed by a checkout device of an existing POS system. When checking out is completed, the processor 201 notifies the transaction processing device 100 that the checking out is completed.

The processor 101 of the transaction processing device 100 instructs the checkout device 200 to perform checking out in ACT 88 in FIG. 12, and then proceeds to ACT 89.

In ACT 89, the processor 101 waits for a notification from the checkout device 200. When the processor 101 receives a notification from the checkout device 200, the processor 101 makes a YES determination and proceeds to ACT 90.

In ACT 90, the processor 101 checks whether there is a notification indicating that checking out is completed. If not, the processor 101 makes a NO determination. The processor 101 confirms notification contents, and proceeds to another processing for performing a processing corresponding to the confirmed operation contents. For example, when the processor 101 confirms that the notification is a notification indicating that checking out is not completed due to an error, the processor 101 executes a processing for coping with the error. Detailed description of the "another processing" will be omitted here.

When a notification indicating that checking out is completed is notified from the checkout device 200 as described above, the processor 101 makes a YES determination in ACT 90 and proceeds to ACT 91.

In ACT 91, the processor 101 confirms whether a delivery commodity is included in a transaction commodity in a transaction for which checking out is completed. If not, the processor 101 makes a NO determination and ends the transaction processing. When it is confirmed that a delivery commodity is included, the processor 101 makes a YES determination and proceeds to ACT 92.

In ACT 92, the processor 101 instructs the user terminal 300 to display a pickup confirmation screen. The pickup confirmation screen is a screen for confirming whether a user picks up a delivery commodity.

Figure 21:
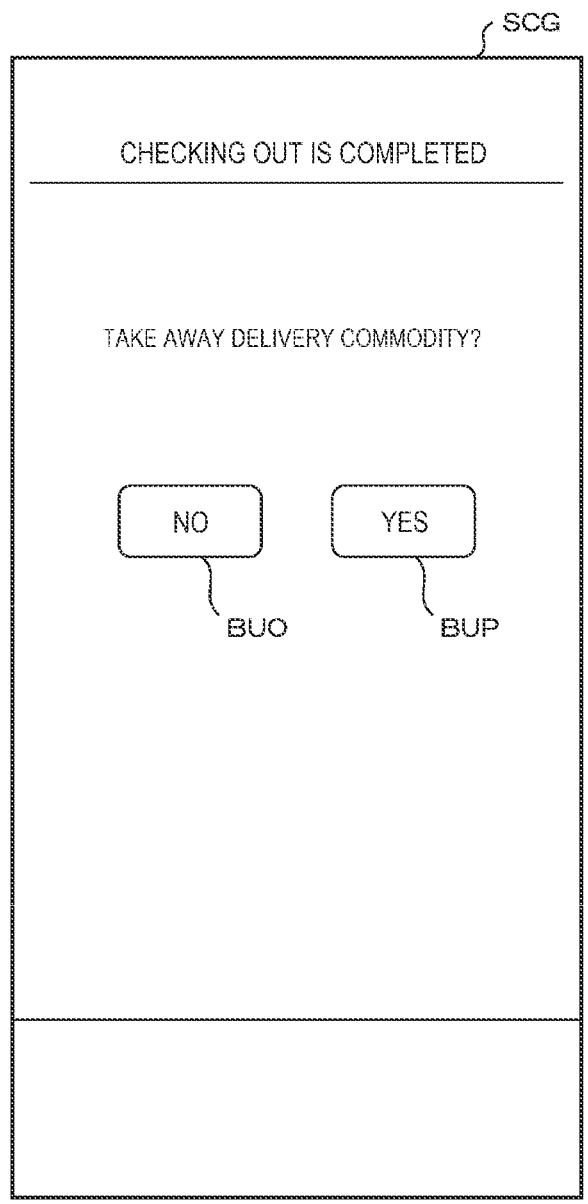
FIG. 21 is a diagram illustrating an example of a pickup confirmation screen.

FIG. 21 is a diagram illustrating an example of a pickup confirmation screen SCG.

The pickup confirmation screen SCG displays a text message for asking a user whether to pick up a delivery commodity. The pickup confirmation screen SCG displays buttons BUO and BUP. The button BUO is a soft key for receiving a declaration of a user that the user will not pick up a delivery commodity. The button BUP is a soft key for receiving a declaration of a user that the user will pick up a delivery commodity.

In ACT 93 in FIG. 12, the processor 101 waits for an operation to be performed on the user terminal 300. For example, when operation contents are notified from the user terminal 300, the processor 101 makes a YES determination and proceeds to ACT 101 in FIG. 13.

In ACT 101, the processor 101 checks whether there has been a declaration indicating that a user will pick up a commodity. If not, the processor 101 makes a NO determination and proceeds to ACT 102.

In ACT 102, the processor 101 checks whether there has been a declaration indicating that a user will not pick up a commodity. If not, the processor 101 makes a NO determination and proceeds to another processing for performing a processing corresponding to the confirmed operation contents.

When a user chooses not to pick up any of the deliverable commodities, the user makes a declaration indicating that the user will not pick up any of the deliverable commodities by performing a predetermined operation such as tapping the button BUO on the pickup confirmation screen SCG. When such an operation is notified from the user terminal 300, the processor 101 makes a YES determination in ACT 102 and proceeds to ACT 103.

In ACT 103, the processor 101 instructs the attendant terminal 400 to display a first delivery instruction screen. The first delivery instruction screen is a screen for instructing a store clerk in charge of a delivery procedure to pick up all the appropriate delivery commodities from the sales area (sales floor) and/or a warehouse/stockroom and then proceed to deliver the delivery commodities. When a plurality of attendant terminals 400 are provided in the transaction processing system 1, the processor 101 instructs one of the attendant terminals 400 selected in advance as a notification destination among the plurality of attendant terminals 400 to display the first delivery instruction screen. Then, the processor 101 ends the transaction processing.

When the mobile communication unit 406 receives instruction data for instructing the display of the first delivery instruction screen, the processor 401 of the attendant terminal 400 displays the first delivery instruction screen on the touch panel 404 according to the instruction data.

FIG. 22 is a diagram illustrating an example of a first delivery instruction screen SCH.

The first delivery instruction screen SCH displays various kinds of information for notifying a store clerk of a delivery procedure to be performed by the store clerk by displaying, for example, a character string as illustrated in FIG. 22.

The store clerk picks up a delivery commodity from a sales area or a warehouse according to the information displayed on the first delivery instruction screen SCH, and then performs a procedure for delivering the delivery commodity to a designated delivery destination.

When a user picks up at least one delivery commodity, the user makes a declaration indicating that the user will pick up the delivery commodity by performing a predetermined operation such as tapping the button BUP on the pickup confirmation screen SCG. When such an operation is notified from the user terminal 300, the processor 101 makes a YES determination in ACT 101 and proceeds to ACT 104.

In ACT 104, the processor 101 instructs the user terminal 300 to display a selection screen. The selection screen is a screen for enabling a user to select a method of handing a picked up delivery commodity over to a store clerk. In a store that provides a smart POS service using the transaction processing system 1 according to the present embodiment, a user is allowed to use any one of two methods called "handover to store clerk" and "putting into basket" as a handover method. In the case of "handover to store clerk", a user hands a delivery commodity over to the store clerk. In the case of "putting to basket", a user puts a delivery commodity into a basket for handover of the commodity (hereinafter, referred to as a delivery basket), and the delivery basket is provided near an installation place of the checkout device 200.

Figure 23:
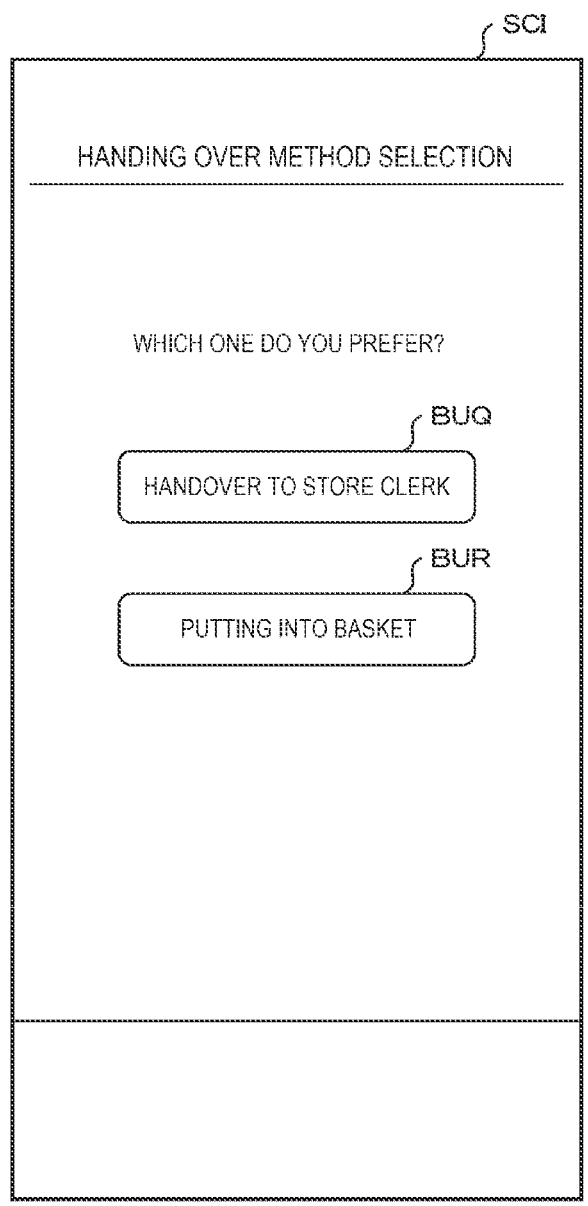
FIG. 23 is a diagram illustrating an example of a selection screen.

FIG. 23 is a diagram illustrating an example of a selection screen SCI.

A text message for enabling a user to select a method for handing over a delivery commodity is displayed on the selection screen SCI. Buttons BUQ and BUR are displayed on the selection screen SCI. The button BUQ is a soft key for receiving a designation of handing a commodity over to a store clerk. The button BUR is a soft key for receiving a designation of putting a commodity into a basket.

Figure 13:
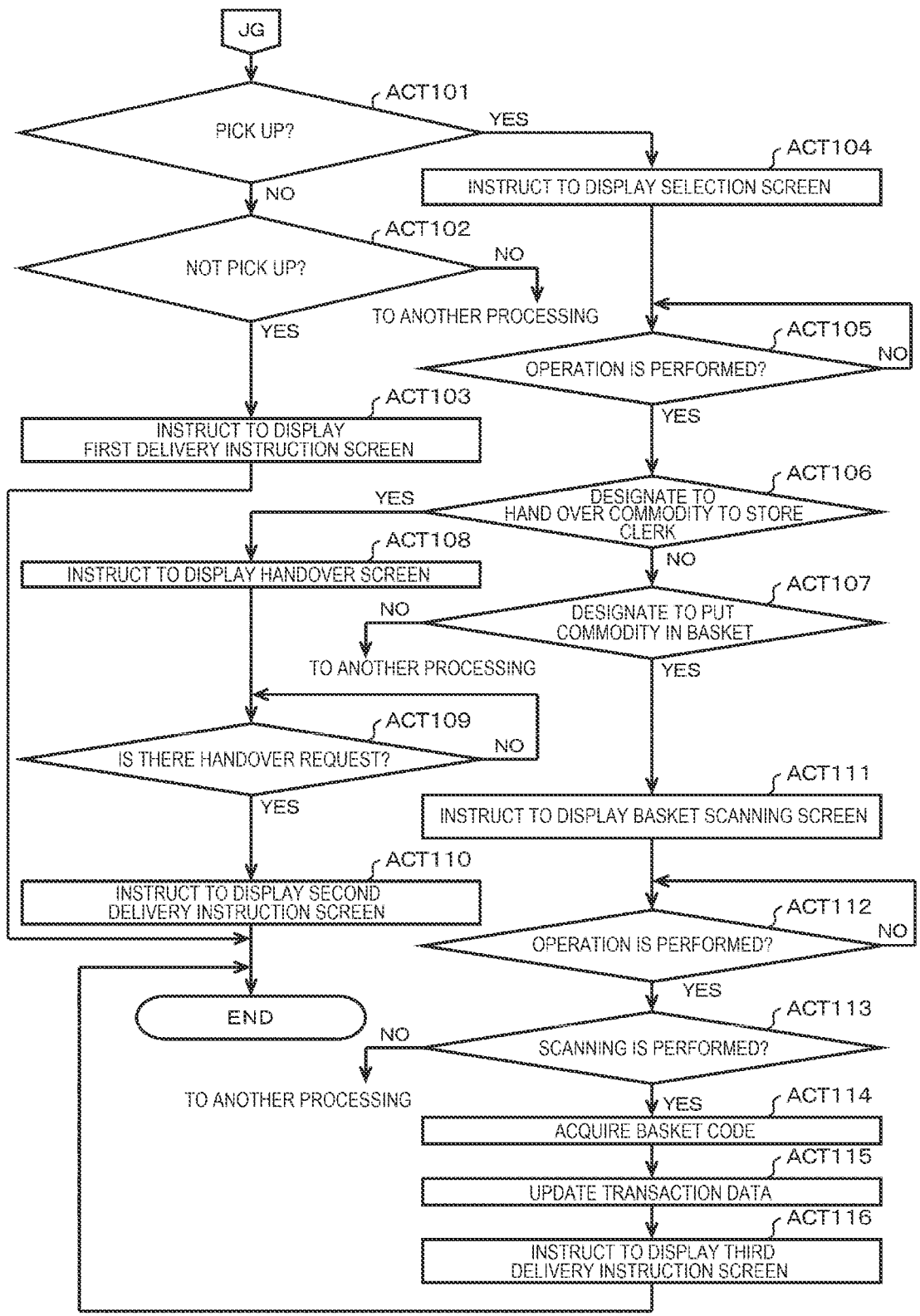

In ACT 105 in FIG. 13, the processor 101 waits for an operation to be performed on the user terminal 300. For example, when operation contents are notified from the user terminal 300, the processor 101 makes a YES determination and proceeds to ACT 106.

In ACT 106, the processor 101 checks whether there has been a designation of handing a commodity over to a store clerk. If not, the processor 101 makes a NO determination and proceeds to ACT 107.

In ACT 107, the processor 101 checks whether there has been a designation of putting a commodity into a basket. If not, the processor 101 makes a NO determination and proceeds to another processing corresponding to the confirmed operation contents.

When a user wants to hand a picked up delivery commodity over to a store clerk, the user makes a designation for handing the commodity over to a store clerk by performing a predetermined operation such as tapping the button BUQ. When such an operation is notified from the user terminal 300, the processor 101 makes a YES determination in ACT 106 and proceeds to ACT 108.

In ACT 108, the processor 101 instructs the user terminal 300 to display a handover screen. The handover screen is a screen for providing information about a delivery commodity to a store clerk.

Figure 24:
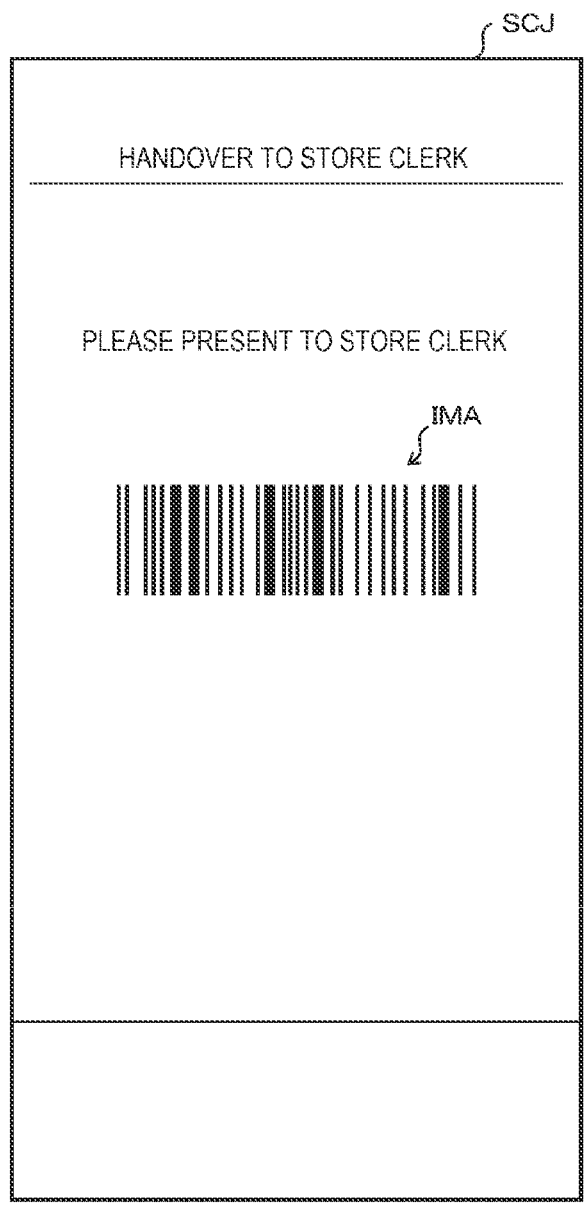
FIG. 24 is a diagram illustrating an example of a handover screen.

FIG. 24 is a diagram illustrating an example of a handover screen SCJ.

A text message for notifying a user to present the handover screen to a store clerk is displayed on the handover screen SCJ. An image IMA indicating a barcode is displayed on the handover screen SCJ. The processor 101 includes at least a transaction code serving as an identifier of a transaction to be processed in the barcode indicated by the image IMA.

The user presents the handover screen SCJ to a store clerk. The store clerk uses the attendant terminal 400 to scan the barcode indicated by the image IMA. Then, the processor 401 of the attendant terminal 400 issues a handover request accompanying with a notification of the transaction code indicated by the barcode to the transaction processing device 100.

The processor 101 of the transaction processing device 100 proceeds to ACT 109 in FIG. 13 after instructing the display of the handover screen in ACT 108.

In ACT 109, the processor 101 waits for a handover request. Then, when the processor 101 receives the handover request from the attendant terminal 400 as described above, the processor 101 proceeds to ACT 110.

In ACT 110, the processor 101 instructs the attendant terminal 400 that issues the handover request to display a second delivery instruction screen. The second delivery instruction screen is a screen for instructing a store clerk to receive a delivery commodity picked up by a user and then deliver delivery commodities including the picked up delivery commodity.

FIG. 25 is a diagram illustrating an example of a second delivery instruction screen SCK.

Various kinds of information for notifying a store clerk of a delivery procedure to be performed by the store clerk is displayed by, for example, a character string as illustrated in FIG. 25, on the second delivery instruction screen SCK.

The store clerk receives, from the user, a delivery commodity carried by the user who presents the handover screen SCJ to the store clerk. If the store clerk determines that there is a delivery commodity different from the delivery commodity received from the user based on the second delivery instruction screen SCK, the store clerk picks up the different delivery commodity from the sales area or warehouse, and then performs a procedure for delivering the different delivery commodity and the delivery commodity received from the user to a designated delivery destination.

When a user decides to put a picked up delivery commodity into a delivery basket, the user makes a designation of putting a commodity into a basket by performing a predetermined operation such as tapping the button BUR on the selection screen SCI. When such an operation is notified from the user terminal 300, the processor 101 makes a YES determination in ACT 107 and proceeds to ACT 111.

In ACT 111, the processor 101 instructs the user terminal 300 to display a basket scanning screen. The basket scanning screen is a screen for scanning a basket code of a delivery basket.

Figure 26:
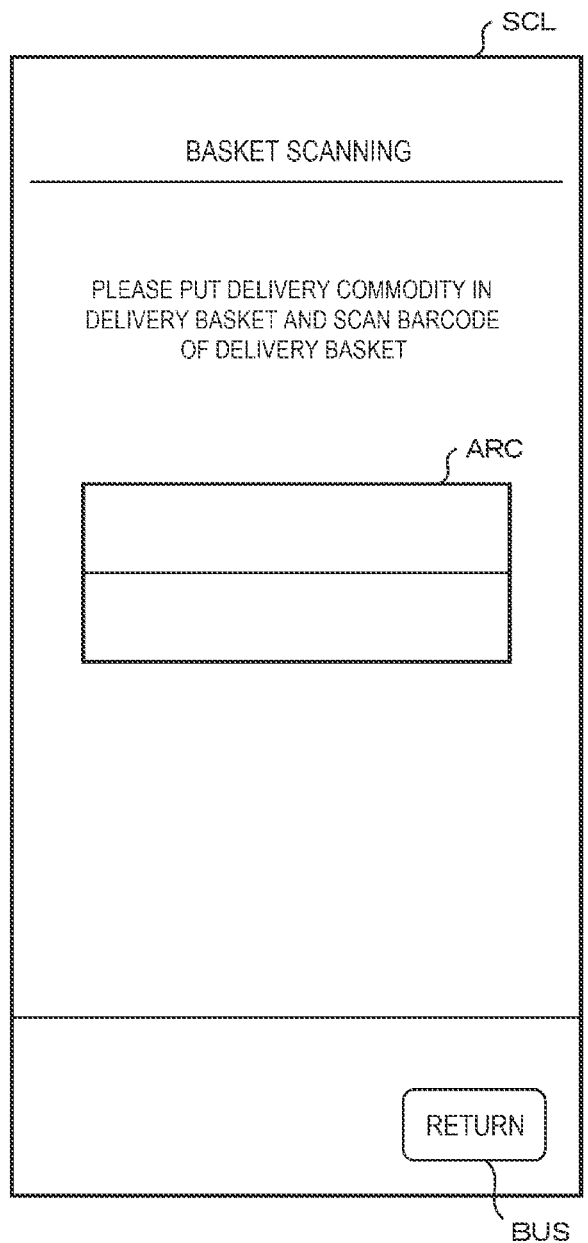
FIG. 26 is a diagram illustrating an example of a basket scanning screen.

FIG. 26 is a diagram illustrating an example of a basket scanning screen SCL.

The basket scanning screen SCL includes a display area ARC and a button BUS. The display area ARC is an area for displaying an image obtained by the camera 305. The button BUS is a soft key for a user to declare to stop scanning of a basket code.

When the basket scanning screen SCL is displayed, the processor 301 of the user terminal 300 starts up the camera 305 and displays an image obtained by the camera 305 in the display area ARC in a superimposed manner. When an operation is performed on the basket scanning screen SCL by a user, the processor 301 notifies the transaction processing device 100 of operation contents as will be described later.

Here, in a store that provides a smart POS service using the transaction processing system 1, a part of the store is set aside as a delivery corner for handling delivery commodities, and a plurality of delivery baskets are provided in the delivery corner. In general, any container, receptacle, or the like such as a box or a shelf, may be used instead of a delivery basket. It is assumed in this example that the delivery corner is near a checkout corner (checkout area) where the checkout device 200 is installed. A basket number for a store clerk to distinguish among the plurality of delivery baskets and a basket code serving as an identifier of each delivery basket are given in advance to a delivery basket. The basket number and the basket code may be the same. The basket number of a delivery basket is displayed in a manner in which a store clerk can see the basket number. A barcode indicating the basket code is displayed in a delivery basket.

A user selects an empty delivery basket and puts a picked up delivery commodity into the selected delivery basket.

When the processor 101 of the transaction processing device 100 completes an instruction for displaying the basket scanning screen in ACT 111 in FIG. 13, the processor 101 proceeds to ACT 112.

In ACT 112, the processor 101 waits for an operation to be performed on the user terminal 300. For example, when operation contents are notified from the user terminal 300, the processor 101 makes a YES determination and proceeds to ACT 113.

In ACT 113, the processor 101 checks whether a scanning has been performed. If not, the processor 101 makes a NO determination and proceeds to another processing corresponding to the confirmed operation contents. For example, the processor 101 confirms that an operation of designating to stop scanning, such as tapping the button BUS, has been performed, and the processor 101 returns to ACT 104 and returns a display screen on the touch panel 304 of the user terminal 300 to the selection screen SCI.

When the basket scanning screen SCL is displayed on the touch panel 304, a user directs the camera 305 to a delivery commodity put in a delivery basket so as to reflect a barcode displayed in the delivery basket in the display area ARC. The processor 301 analyzes an image obtained by the camera 305 and attempts to read the barcode. When the barcode is read, the processor 301 notifies the transaction processing device 100 that scanning is performed accompanying with a notification for notifying barcode data indicated by the read barcode. A user may put a delivery commodity in a delivery basket after the barcode is read.

In response to the notification from the user terminal 300 as described above, the processor 101 of the transaction processing device 100 makes a YES determination in ACT 113 in FIG. 13 and proceeds to ACT 114.

In ACT 114, the processor 101 acquires the basket code indicated by the notified barcode data. Thus, the processor 101 executes an information processing based on the transaction processing program PRA, thereby the processor 101 to function as an acquisition unit.

In ACT 115, the processor 101 updates the transaction data so as to include the acquired basket code. Thus, the processor 101 executes an information processing based on the transaction processing program PRA, thereby causing the processor 101 to function as an association unit.

In ACT 116, the processor 101 instructs the attendant terminal 400 to display a third delivery instruction screen. The third delivery instruction screen is a screen for instructing delivery of delivery commodities including a delivery commodity put in a delivery basket. When a plurality of attendant terminals 400 are provided in the transaction processing system 1, the processor 101 instructs the attendant terminal 400 determined in advance as a notification destination among the plurality of attendant terminals 400 to display the third delivery instruction screen. Then, the processor 101 ends the transaction processing. The processor 101 may instruct the display of the third delivery instruction screen as follows in addition to the instruction of the display in ACT 116 or without the instruction of the display in ACT 116. That is, a store clerk uses the attendant terminal 400 to scan the barcode displayed in a delivery basket in which a delivery commodity is put. Then, the processor 401 of the attendant terminal 400 issues, to the transaction processing device 100, a request for the third delivery instruction screen accompanying with a notification of a basket code indicated by the scanned barcode. In response to the request, the processor 101 of the transaction processing device 100 instructs the attendant terminal 400 which is a request source to display the third delivery instruction screen based on the transaction data DAA including the notified basket code.

FIG. 27 is a diagram illustrating an example of a third delivery instruction screen SCM.

Various kinds of information for notifying a store clerk of a delivery procedure to be performed by the store clerk is displayed by, for example, a character string as illustrated in FIG. 27, on the third delivery instruction screen SCM. The information represented by the character string includes a basket number associated with a delivery basket identified by the basket code included in the transaction data DAA. In the example in FIG. 27, the basket number is "1001".

A store clerk confirms the delivery commodity put in a delivery basket assigned with the basket number displayed on the third delivery instruction screen SCM, and confirms whether a delivery commodity that is not put in the delivery basket is included in delivery commodities displayed on the third delivery instruction screen SCM. When there is a delivery commodity that is not put in the delivery basket, the corresponding delivery commodity is picked up from a sales area or a warehouse, and then the store clerk performs a procedure for delivering the corresponding delivery commodity and the delivery commodity put in the delivery basket to a designated delivery destination.

As described above, the transaction processing device 100 manages (tracks) whether any transaction commodity is a delivery commodity. Therefore, a store clerk can arrange delivery for a deliverable commodity (delivery commodity) based just on a determination that a transaction commodity is deliverable. Therefore, a user can entrust a store clerk to pick up a delivery commodity from a sales area and the customer (user) can pick up just the take-away commodities from the sales area, so that it is possible to reduce customer shopping effort.

Since there is a period of time from when a user registers a delivery commodity to when a store clerk arranges delivery for the registered delivery commodity, in some instances, the delivery commodity may be sold out by the time the store clerk attempts to pick up the delivery commodity.

However, when a registered deliverable commodity is in a low inventory state, the transaction processing device 100 may cause the user terminal 300 to display the recommendation screen SCF to recommend that the user go ahead and pick up the delivery commodity rather than wait for the store clerk to perform the pick up later. A user can thus more quickly pick up a delivery commodity according to this recommendation, to avoid the delivery commodity being sold out before the arrangement of delivery by the store clerk, and it is still possible to quickly arrange delivery for such a delivery commodity by handing over the commodity to the store clerk at checkout or dropping off the commodity in the delivery area or the like.

When a user does not prefer to personally pick up any one of the deliverable commodities, the transaction processing device 100 displays the first delivery instruction screen SCH to notify that all the deliverable commodities are to be picked up later by a store clerk. Accordingly, a store clerk can easily recognize that it is required to pick up the delivery commodities from a store or a warehouse.

When a user personally picks up at least one delivery commodity, the user can put the commodity in a delivery basket, so that the transaction processing device 100 can enable the user to hand the delivery commodity over to a store clerk for delivery. That is, the user does not need to wait for the store clerk to make an arrangement when the user personally picks up and hands over the delivery commodity.

When a user directly hands a picked up delivery commodity over to a store clerk, the transaction processing device 100 causes the attendant terminal 400 to scan a barcode displayed on the user terminal 300, so that it is possible to easily provide information regarding to which transaction the commodity belongs to the store clerk.

The transaction processing device 100 enables a user to hand a personally picked up delivery commodity over to a store clerk using any one of the above methods. Therefore, the user can hand over the delivery commodity using a method preferred by the user.

The present embodiment can be modified in various ways such as follows.

A part of processing executed by the processor 101 may be executed by the processor 301 of the user terminal 300. For example, the transaction data may be stored in the main storage unit 302 or the auxiliary storage unit 303, and the processor 301 may update the transaction data. In this case, all or a part of the determination unit, the decision unit, and the registration unit can be implemented by the processor 301.

A store operation may be an operation in which a user does not actually pick up the delivery commodities from a sales area, but rather just designates an intention to purchase a delivery commodity while in the sales area or the like. In this case, for example, after the processor 101 makes a YES determination in ACT 91 in FIG. 12, the processor 101 may proceed directly to ACT 103 in FIG. 13.

The options for handover of a delivery commodity from a user to a store clerk might be only one of handover to store clerk or putting into a basket. In such a case when handover to a store clerk is the only option, after the processor 101 makes a YES determination in ACT 101 in FIG. 13, the processor 101 may proceed directly to ACT 108. When putting the delivery commodity into a basket is the only option, after the processor 101 makes a YES determination in ACT 101, the processor 101 may proceed directly to ACT 111.

The setting of a commodity as a delivery commodity or the setting of a delivery condition may be executed without using the checkout device 200 as a user interface, or may be executed only by using the checkout device 200 as a user interface.

A part of or all functions described as implemented by the processors 101, 201, 301, and 401 executing software may be implemented by hardware such as a logic circuit that executes information processing not based on a software program. The described functions may also be implemented by combining software with dedicated hardware.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A transaction processing system for retail stores selling optionally deliverable commodities to customers, the system comprising:
    a communication network in a store, the communication network being connectable to a mobile user terminal in the store, the mobile user terminal permitting a customer to register items on a sales floor of the store to be purchased in a sales transaction; and
    a transaction processing server connected to the communication network and storing commodity codes for items sold by the store, each commodity code being associated with a deliverable flag value indicating whether the item associated with the commodity code is a deliverable commodity, the transaction processing server including a processor configured to:
        determine whether a registered commodity code from the mobile user terminal is a deliverable commodity based on the deliverable flag value associated with the registered commodity code;
        cause the mobile user terminal to display a decision screen if the item corresponding to the registered commodity code is a deliverable commodity for receiving a selection from the customer to have the item delivered or not; and
        register the selection in conjunction with the registered commodity code to permit settlement of the sales transaction including the deliverable commodity.

2. The transaction processing system according to claim 1, further comprising:
    a settlement terminal connected to the communication network and configured to receive transaction data from the transaction processing server and perform payment processing for settlement of the sales transaction.

3. The transaction processing system according to claim 2, further comprising:
    an attendant terminal connected to the communication network and configured to receive notifications from the transaction processing server when a settled sales transaction includes an item that is a deliverable commodity that the customer has selected to have delivered.

4. The transaction processing system according to claim 2, wherein the settlement terminal includes a printer and the settlement terminal causes the printer to print a delivery instruction when the settled sales transaction includes an item that is a deliverable commodity that the customer has selected to have delivered.

5. The transaction processing system according to claim 1, further comprising:
    an attendant terminal connected to the communication network and configured to receive notifications from the transaction processing server when a settled sales transaction includes an item that is deliverable commodity that the customer has selected to have delivered.

6. The transaction processing system according to claim 1, further comprising:
    a checkout unit configured to perform checking out processing for all items registered in the sales transaction; and
    a notification unit configured to notify a store clerk that an item in the sales transaction is a deliverable commodity that the customer has selected to have delivered.

7. The transaction processing system according to claim 1, wherein the processor is further configured to:
    acquire a delivery destination from the mobile user terminal.

8. The transaction processing system according to claim 1, wherein the processor is further configured to:
    generate a handover barcode encoding transaction information when an item in the sales transaction is a deliverable commodity that the customer has selected to have delivered.

9. The transaction processing system according to claim 1, wherein the processor is further configured to:
    acquire from the mobile user terminal an identifier of a container for accommodating a deliverable commodity; and
    associate the identifier with a delivery destination selected by the customer in the sales transaction.

10. The transaction processing system according to claim 1, wherein the processor is further configured to:
    determine an inventory state associated with a registered commodity code and cause the mobile user terminal to display a screen recommending that the customer pick up the item when the inventory state is low.

11. A transaction processing device for transaction processing systems for retail stores selling optionally deliverable commodities to customers, the device comprising:
    a communication interface connectable to a communication network in a store, the communication network being connectable to a mobile user terminal in the store, the mobile user terminal permitting a customer to register items on a sales floor of the store to be purchased in a sales transaction;
    a storage unit storing commodity codes for items sold by the store, each commodity code being associated with a deliverable flag value indicating whether the item associated with the commodity code is a deliverable commodity; and a processor configured to:
  determine whether a registered commodity code from the mobile user terminal is a deliverable commodity based on the deliverable flag value associated with the registered commodity code;
  cause the mobile user terminal to display a decision screen if the item corresponding to the registered commodity code is a deliverable commodity for receiving a selection from the customer to have the item delivered or not; and
  register the selection in conjunction with the registered commodity code to permit settlement of the sales transaction including the deliverable commodity.

12. The transaction processing device according to claim 11, wherein the processor further is configured to:
  send transaction data via the communication interface to a settlement terminal connected to the communication network that performs payment processing for settlement of the sales transaction.

13. The transaction processing device according to claim 12, wherein the processor is further configured to:
  send notifications via the communication interface to an attendant terminal connected to the communication network when a settled sales transaction includes an item that is a deliverable commodity that the customer has selected to have delivered.

14. The transaction processing device according to claim 11, wherein the processor is further configured to:
  send notifications via the communication interface to an attendant terminal connected to the communication network when a settled sales transaction includes an item that is a deliverable commodity that the customer has selected to have delivered.

15. The transaction processing device according to claim 11, wherein the processor is further configured to:
  send a notification via the communication interface to notify a store clerk that an item in the sales transaction is a deliverable commodity that the customer has selected to have delivered.

16. The transaction processing device according to claim 11, wherein the processor is further configured to:
  acquire a delivery destination from the mobile user terminal via the communication interface.

17. The transaction processing device according to claim 11, wherein the processor is further configured to:
  generate a handover barcode encoding transaction information when an item in the sales transaction is a deliverable commodity that the customer has selected to have delivered.

18. The transaction processing device according to claim 11, wherein the processor is further configured to:
  acquire from the mobile user terminal an identifier of a container for accommodating a deliverable commodity; and
  associate the identifier with a delivery destination selected by the customer in the sales transaction.

19. The transaction processing device according to claim 11, wherein the processor is further configured to:
  determine an inventory state associated with a registered commodity code and cause the mobile user terminal to display a screen recommending that the customer pick up the item when the inventory state is low.

20. A non-transitory, computer-readable medium storing program instructions which when executed by a processor of a transaction processing server causes the processor to perform a method comprising:
  determining whether a registered commodity code received from a mobile user terminal is a deliverable commodity based on a deliverable flag value associated with the registered commodity code;
  causing the mobile user terminal to display a decision screen if an item corresponding to the registered commodity code is a deliverable commodity for receiving a selection from a customer to have the item delivered or not; and
  registering the selection in conjunction with the registered commodity code to permit settlement of the sales transaction including the deliverable commodity.

* * * * *